US012649287B2

(12) United States Patent
Ito et al.

(10) Patent No.: US 12,649,287 B2
(45) Date of Patent: Jun. 9, 2026

(54) METHOD OF MANUFACTURING COMPOSITE MEMBER

(71) Applicant: SINTOKOGIO, LTD., Nagoya (JP)

(72) Inventors: Yuuka Ito, Nagoya (JP); Eiji Yamaguchi, Nagoya (JP); Yukinori Suzuki, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 39 days.

(21) Appl. No.: 18/133,107

(22) Filed: Apr. 11, 2023

(65) Prior Publication Data

US 2023/0330947 A1       Oct. 19, 2023

(30) Foreign Application Priority Data

Apr. 15, 2022    (JP) ................................. 2022-067736

(51) Int. Cl.
*B29C 65/00*            (2006.01)
(52) U.S. Cl.
CPC .. *B29C 66/02245* (2013.01); *B29C 66/73161* (2013.01); *B29C 66/742* (2013.01); *B29C 66/72321* (2013.01)
(58) Field of Classification Search
None
See application file for complete search history.

(56) References Cited

U.S. PATENT DOCUMENTS

2017/0320242 A1    11/2017  Kok
2019/0077089 A1*   3/2019  Nishiguchi ........... B29C 66/742
2020/0368976 A1    11/2020  Liu
2021/0107270 A1*   4/2021  Horie ........................ B32B 7/12
2021/0268771 A1    9/2021  Okubo et al.
2021/0347127 A1*   11/2021  Nakamura .......... B29C 66/7392
2022/0063185 A1    3/2022  Isaki
2023/0321929 A1*   10/2023  Jeong ..................... B29C 70/34

FOREIGN PATENT DOCUMENTS

CN            112644000 A   *   4/2021   ............. B24C 1/086
DE        112017000107 T5        5/2018
DE     10 2020 212 599 A1       4/2021
DE     11 2019 003 308 T5        4/2021
EP          3 778 219 A1        2/2021
EP          3 865 283 A1        8/2021
EP          3 865 284 A1        8/2021
(Continued)

OTHER PUBLICATIONS

WO 2017090392 machine translation (Year: 2017).*
(Continued)

*Primary Examiner* — Barbara J Musser
(74) *Attorney, Agent, or Firm* — Faegre Drinker Biddle & Reath LLP

(57)            ABSTRACT

The manufacturing method includes surface treatment and bonding. In the surface treatment, micro-order or nano-order asperities are formed on a surface of the metallic member. The bonding includes directly bonding the metallic member and the fiber-reinforced resin member by repeatedly bonding a melted portion of the fiber-reinforced resin member to the surface of the metallic member while partially melting the fiber-reinforced resin member, the metallic member having the asperities formed by the surface treatment.

14 Claims, 11 Drawing Sheets

(56)  References Cited

FOREIGN PATENT DOCUMENTS

| | | | | | |
|----|-----------------|----|---------|-----------|-----------|
| JP | 2016-141052 | A | 8/2016 | | |
| JP | 2017-124556 | A | 7/2017 | | |
| JP | 2017-177465 | A | 10/2017 | | |
| JP | 2018-501979 | A | 1/2018 | | |
| JP | 2019-025868 | A | 2/2019 | | |
| JP | 2020-082164 | A | 6/2020 | | |
| JP | 2021-062497 | A | 4/2021 | | |
| JP | 2021-120196 | A | 8/2021 | | |
| WO | WO-2006042251 | A2 * | 4/2006 | ............ | B23K 20/10 |
| WO | 2016/143586 | A1 | 9/2016 | | |
| WO | 2017/141381 | A1 | 8/2017 | | |
| WO | WO-2020075802 | A1 * | 4/2020 | ............ | B21D 22/02 |
| WO | 2020/138174 | A1 | 7/2020 | | |

OTHER PUBLICATIONS

Austrian Office Action issued Apr. 7, 2025 in Application No. A00043/2023.
Office Action for Austrian patent application No. A 43/2023, filed Apr. 5, 2023, mailed Oct. 1, 2025.
Office Action for Japanese patent application No. P2022-067736, mailed Oct. 28, 2025.
Japanese Office Action issued Apr. 21, 2026 in Application No. P2022-067736.

* cited by examiner

10

13

14

15

12

11

*Fig.10A*
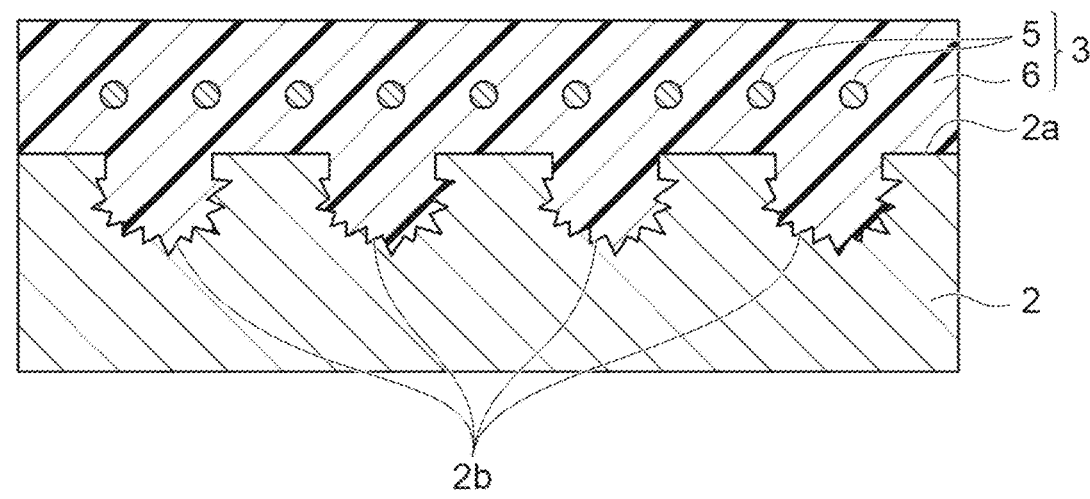
*Fig.10B*
*Fig.10C*
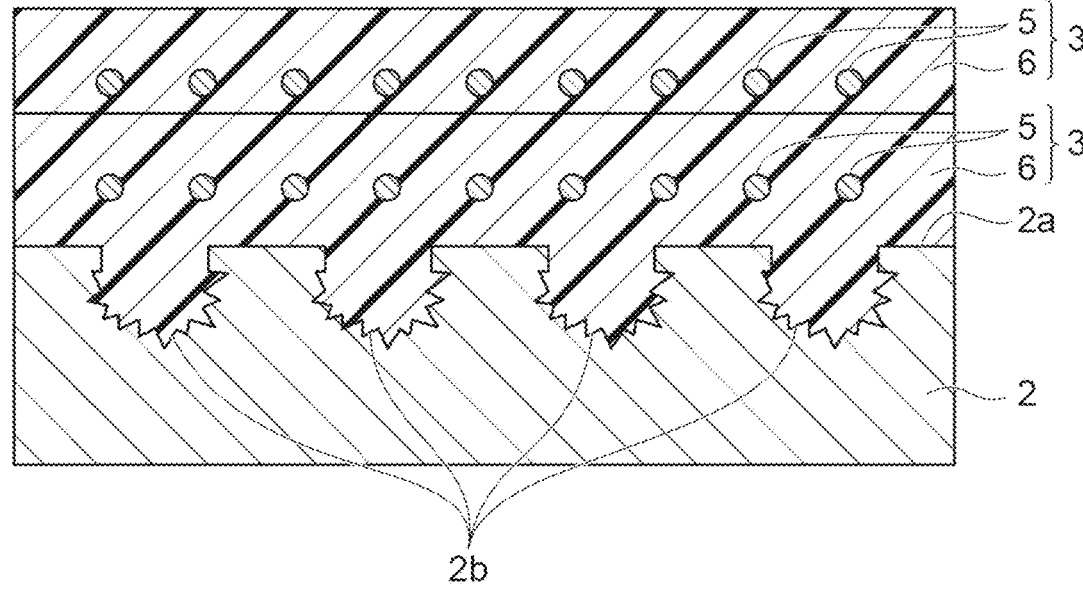

Fig.11

| | | Metal | Matrix resin | Fiber | Blasting | Additive | Molding method※1 | Metallic surface temperature during molding [°C] | Shearing strength [MPa] | Shearing strength after temperature change impact test [MPa] | Rate of decrease of shearing strength [%] |
|---|---|---|---|---|---|---|---|---|---|---|---|
| Criteria | Example 1 | A5052 | PA6 | CF | ○ | ○ | A | 23 | 42 | 40 | 4.8 |
| Surface temperature change | Example 2 | A5052 | PA6 | CF | ○ | ○ | A | 80 | 40 | 35 | 12.5 |
| | Comparative example 1 | A5052 | PA6 | CF | ○ | ○ | A | 150 | 38 | 25 | 34.2 |
| | Example 3 | A5052 | PA6 | CF | ○ | ○ | B | 23 | 40 | 38 | 5.0 |
| | Example 4 | A5052 | PA6 | CF | ○ | ○ | B | 80 | 39 | 33 | 15.4 |
| Molding method change | Comparative example 2 | A5052 | PA6 | CF | ○ | ○ | B | 150 | 38 | 24 | 36.8 |
| | Comparative example 3 | A5052 | PA6 | CF | ○ | × | C | 140※2 | 30 | 19 | 36.7 |
| | Comparative example 4 | A5052 | PA6 | CF | ○ | × | D | 220※2 | 31 | 22 | 29.0 |
| No additive | Example 5 | A5052 | PA6 | CF | ○ | × | A | 23 | 32 | 30 | 6.3 |
| No blasting | Comparative example 5 | A5052 | PA6 | CF | × | ○ | A | 23 | Unbonded | – | – |
| No blasting, no additive | Comparative example 6 | A5052 | PA6 | CF | × | × | A | 23 | Unbonded | – | – |
| Metal change | Example 6 | SPCC | PA6 | CF | ○ | ○ | A | 23 | 39 | 36 | 7.7 |
| Fiber change | Example 7 | A5052 | PA6 | GF | ○ | ○ | A | 23 | 36 | 34 | 5.6 |
| | Example 8 | A5052 | PPS | CF | ○ | × | A | 23 | 39 | 36 | 7.7 |
| Resin change | Example 9 | A5052 | PEEK | CF | ○ | × | A | 23 | 43 | 39 | 9.3 |
| | Example 10 | A5052 | PBT | CF | ○ | × | A | 23 | 40 | 37 | 7.5 |

※1　A: Ultrasonic continuous welding　B: Tape placement molding　C: Injection molding　D: Press forming ※2　Mold temperature during molding was described as metallic surface temperature during molding

METHOD OF MANUFACTURING COMPOSITE MEMBER

CROSS-REFERENCE TO RELATED APPLICATIONS

This application is based on and claims the benefit of priority from Japanese Patent Application No. 2022-067736 filed on Apr. 15, 2022, and the entire contents of which are incorporated herein by reference.

TECHNICAL FIELD

The present disclosure relates to a method of manufacturing a composite member and the composite member.

BACKGROUND

WO 2017/141381 discloses a method of manufacturing a composite member. In this method, the composite member, in which a base material and a resin member are bonded to each other by injection molding, is manufactured. On a surface of the base material, micro-order or nano-order asperities are formed. A resin member is applied into the micro-order or nano-order asperities and is hardened therein, producing an enhanced anchor effect as compared with millimeter-order asperities. Thus, the composite member manufactured by this method has high bonding strength.

SUMMARY

Technical Problem

Some metallic members and resin members used for composite members may have a large difference in coefficient of thermal expansion. In this case, in the manufacturing process of a composite member, a heated metallic member may be bonded to a resin member while being thermally expanded, and then the metallic member may considerably shrink as compared with the resin member before being placed in a room temperature environment. Such volume fluctuations caused by a difference in coefficient of thermal expansion may deform the composite member and lead to exfoliation on a bonded interface between the metallic member and the resin member. There is still room for improvement in manufacturing method described in WO 2017/141381 in terms of suppression of a reduction in bonding strength, which is caused by a difference in coefficient of thermal expansion in the composite member including the metallic member as a base material.

Solutions to Problem

According to an aspect of the present disclosure, a method of manufacturing a composite member is provided, the composite member including a metallic member and a fiber-reinforced resin member that are bonded to each other. The manufacturing method includes surface treatment and bonding. In the surface treatment, micro-order or nano-order asperities are formed on a surface of the metallic member. The bonding includes directly bonding the metallic member and the fiber-reinforced resin member by repeatedly bonding a melted portion of the fiber-reinforced resin member to the surface of the metallic member while partially melting the fiber-reinforced resin member, the metallic member having the asperities formed by the surface treatment.

According to the manufacturing method, the micro-order or nano-order asperities are formed on the surface of the metallic member by the surface treatment. In the bonding, the fiber-reinforced resin member is partially melted and is bonded to the surface of the metallic member. The fiber-reinforced resin member is applied into the asperities formed on the surface of the metallic member and is hardened therein, producing an anchor effect. In the bonding, a location of melting is limited to a part of the fiber-reinforced resin member, thereby suppressing heating of the overall metallic member to a high temperature. A small temperature change over the metallic member before and after the bonding reduces expansion and shrinkage of the metallic member, thereby reducing the influence of the thermal expansion of the metallic member on the deformation of the composite member. By repeating partial melting and bonding of the fiber-reinforced resin member, the fiber-reinforced resin member is gradually bonded to the surface of the metallic member. The fiber-reinforced resin member and the metallic member are sequentially cooled from the bonded portions, and the bonded portions sequentially return to the dimensions before heating. Thus, the influence of a difference in thermal expansion between the fiber-reinforced resin member and the metallic member on the deformation of the composite member becomes partial and temporary influence, and bonding is gradually performed while reducing the difference in thermal expansion. This reduces deformation on the composite member as compared with the case in which the fiber-reinforced resin member is entirely melted and then is bonded to the entire surface of the metallic member at a time. As described above, this manufacturing method can suppress the occurrence of deformation and exfoliation on the composite member even if a difference in coefficient of thermal expansion is made between the metallic member and the fiber-reinforced resin member. Thus, according to the method of manufacturing the composite member, a reduction in bonding strength can be suppressed, the reduction being caused by a difference in coefficient of thermal expansion between the members.

The method of manufacturing the composite member according to the embodiment, wherein the bonding may include directly bonding the fiber-reinforced resin member to the surface of the metallic member by tape placement molding or ultrasonic continuous welding. In this case, a mold for placing the metallic member and the fiber-reinforced resin member is not necessary, so that heat is not applied to the overall metallic member or the overall fiber-reinforced resin member. Thus, according to the method of manufacturing the composite member, the occurrence of deformation and exfoliation on the composite member can be suppressed, the deformation and exfoliation being caused by expansion and shrinkage of the metallic member and the fiber-reinforced resin member. Since a mold is not necessary, the degree of freedom in designing of the manufactured composite member is improved.

The method of manufacturing the composite member according to the embodiment further includes adding a compound having a fluorene skeleton to the fiber-reinforced resin member, wherein the bonding may include directly bonding the metallic member and the fiber-reinforced resin member by repeatedly bonding a melted portion of the fiber-reinforced resin member to the surface of the metallic member while partially melting the fiber-reinforced resin member containing the compound added by the adding, the metallic member having the asperities formed by the surface treatment. In the adding, the compound having the fluorene skeleton is added to the fiber-reinforced resin member, thereby reducing, for example, the melting viscosity of the fiber-reinforced resin member and improving flowability during melting. Hence, the transfer of the fiber-reinforced resin member improves with higher adhesion when the fiber-reinforced resin member is molded on the surface of the metallic member in the bonding. The fiber-reinforced resin member to which the compound having the fluorene skeleton is added melts at a low temperature. Thus, heating of the metallic member and the fiber-reinforced resin member to a high temperature is suppressed in the bonding. Thus, according to the method of manufacturing the composite member, the occurrence of deformation and exfoliation on the composite member can be suppressed, the deformation and exfoliation being caused by expansion and shrinkage of the metallic member and the fiber-reinforced resin member. This can further suppress a reduction in bonding strength, the reduction being caused by a difference in coefficient of thermal expansion between the members.

The method of manufacturing the composite member according to the embodiment, wherein an arithmetic mean inclination on the surface of the metallic member having the asperities formed by the surface treatment may be 0.17 or more and 0.50 or less. In this case, in the surface treatment, the asperities are formed such that an arithmetic mean inclination on the surface of the metallic member is 0.17 or more and 0.50 or less. The method of manufacturing the composite member can increase the surface area of the metallic member, thereby properly obtaining the anchor effect of the composite member.

The method of manufacturing the composite member according to the embodiment, wherein the surface treatment may include forming the asperities by blasting. According to the method of manufacturing the composite member, the surface structure of the bonded surface can be quantitatively controlled unlike in other surface treatment techniques for bonding the members, thereby performing surface treatment at low cost in a short time.

According to another embodiment of the present disclosure, a composite member is provided. The composite member includes a metallic member and a fiber-reinforced resin member. The metallic member has micro-order or nano-order asperities on a surface of the metallic member. The fiber-reinforced resin member is in direct contact with the surface of the metallic member having the asperities. After a temperature change impact test is conducted, a shearing strength in the composite member is reduced only by 15.4% or less as compared with a shearing strength before the temperature change impact test is conducted, the temperature change impact test repeating a cycle 300 times, the cycle including heating the composite member from −40° C. to 140° C., keeping the composite member at 140° C. for 30 minutes, cooling the composite member from 140° C. to −40° C., and keeping the composite member at −40° C. for 30 minutes.

The metallic member has the micro-order or nano-order asperities on the surface of the metallic member in the composite member. The fiber-reinforced resin member is applied into the asperities formed on the surface of the metallic member and is hardened therein, producing an anchor effect. Moreover, the composite member is formed by bonding the metallic member and the fiber-reinforced resin member at a proper temperature, so that after the temperature change impact test, a reduction in shearing strength can be suppressed to 15.4% or less as compared with the shearing strength before the temperature change impact test. Thus, the composite member can suppress a reduction in bonding strength, the reduction being caused by a difference in coefficient of thermal expansion between the members.

The composite member according to the embodiment, wherein the fiber-reinforced resin member may contain a compound having a fluorene skeleton. The compound having the fluorene skeleton is contained in the fiber-reinforced resin member, thereby reducing the melting viscosity of the fiber-reinforced resin member and improving flowability during melting. Hence, the transfer of the fiber-reinforced resin member improves with higher adhesion when the fiber-reinforced resin member is molded on the surface of the metallic member. The fiber-reinforced resin member to which the compound having the fluorene skeleton is added melts at a low temperature. Thus, heating to a high temperature is suppressed when the metallic member and the fiber-reinforced resin member are bonded to each other, so that the composite member is hardly deformed or peeled off by the expansion and shrinkage of the metallic member and the fiber-reinforced resin member. Thus, the composite member can suppress a reduction in bonding strength, the reduction being caused by a difference in coefficient of thermal expansion between the members.

The composite member according to the embodiment, wherein an arithmetic mean inclination on the surface of the metallic member having the asperities may be 0.17 or more and 0.50 or less. By using the metallic member having the surface with an arithmetic mean inclination of 0.17 or more and 0.50 or less, the surface area of the metallic member increases, allowing the composite member to properly obtain an anchor effect.

Advantageous Effect of Invention

According to an aspect and an embodiment of the present disclosure, a method of manufacturing a composite member is provided, by which a reduction in bonding strength can be suppressed, the reduction being caused by a difference in coefficient of thermal expansion between members, and the composite member capable of suppressing a reduction in bonding strength is provided, the reduction being caused by a difference in coefficient of thermal expansion between the members.

BRIEF DESCRIPTION OF THE DRAWINGS

FIGS. 10A-10C are explanatory drawings of the manufacturing process of the composite member; and FIG. 11 is an explanatory drawing of the results of temperature change impact tests according to examples.

DETAILED DESCRIPTION

Figure 1:
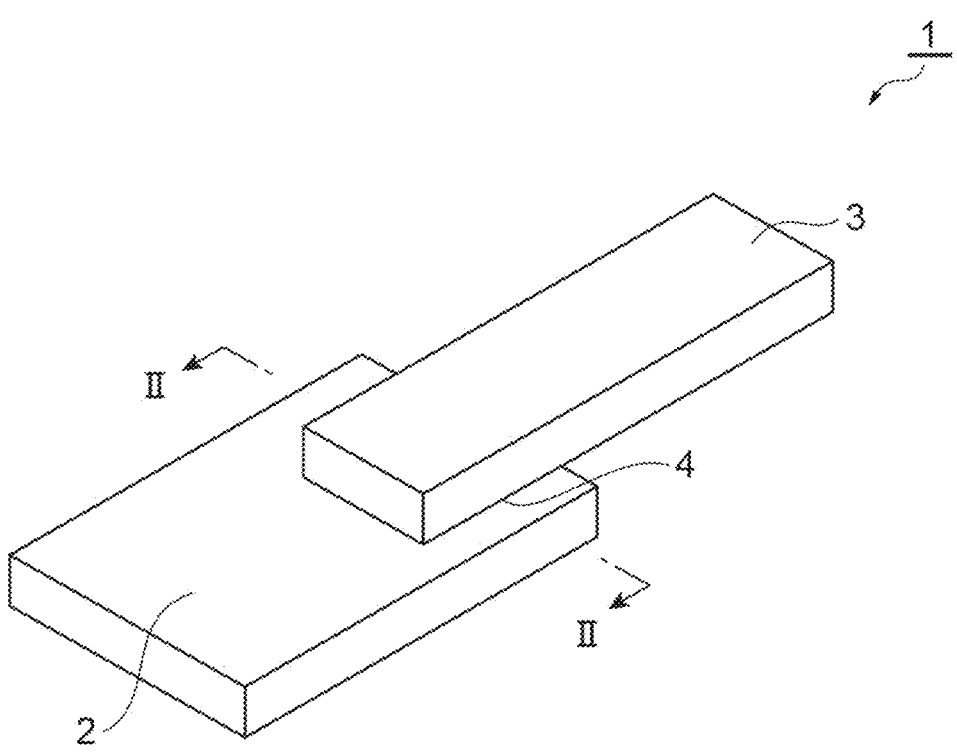
FIG. 1 is a perspective view illustrating a composite member according to an embodiment.

An embodiment will be described below with reference to the accompanying drawings. In the following explanation, the same or equivalent elements are indicated by the same reference numerals and a duplicate explanation thereof is omitted. Moreover, "bonding strength" in the present embodiment will be described as "shearing strength".
[Composite Member]

FIG. 1 is a perspective view illustrating a composite member 1 according to the embodiment. As illustrated in FIG. 1, the composite member 1 is a member including a plurality of members integrated by bonding. The composite member 1 has impact absorption as will be described later. The composite member 1 includes a metallic member 2 and a fiber-reinforced resin member 3. The metallic member 2 is, for example, a plate member. The fiber-reinforced resin member 3 is in direct contact with a surface of the metallic member 2. In FIG. 1, the fiber-reinforced resin member 3 is in direct contact with a part of the surface of the metallic member 2 (a bonded surface 4 of the metallic member 2) and has a lap joint structure. The material of the metallic member 2 is, for example, aluminum, iron, copper, or an alloy thereof. The material of the metallic member 2 is not limited thereto.

The material of the fiber-reinforced resin member 3 is thermoplastic fiber-reinforced resin. The thermoplastic fiber-reinforced resin includes, for example, aromatic poly-amide fiber reinforced thermo plastics (AFRTP), carbon fiber reinforced thermo plastics (CFRTP), and glass fiber reinforced thermo plastics (GFRTP). The matrix resin of the fiber-reinforced resin member 3 (the material of a resin part 6, which will be described later) is, for example, polyamide.

Figure 2:
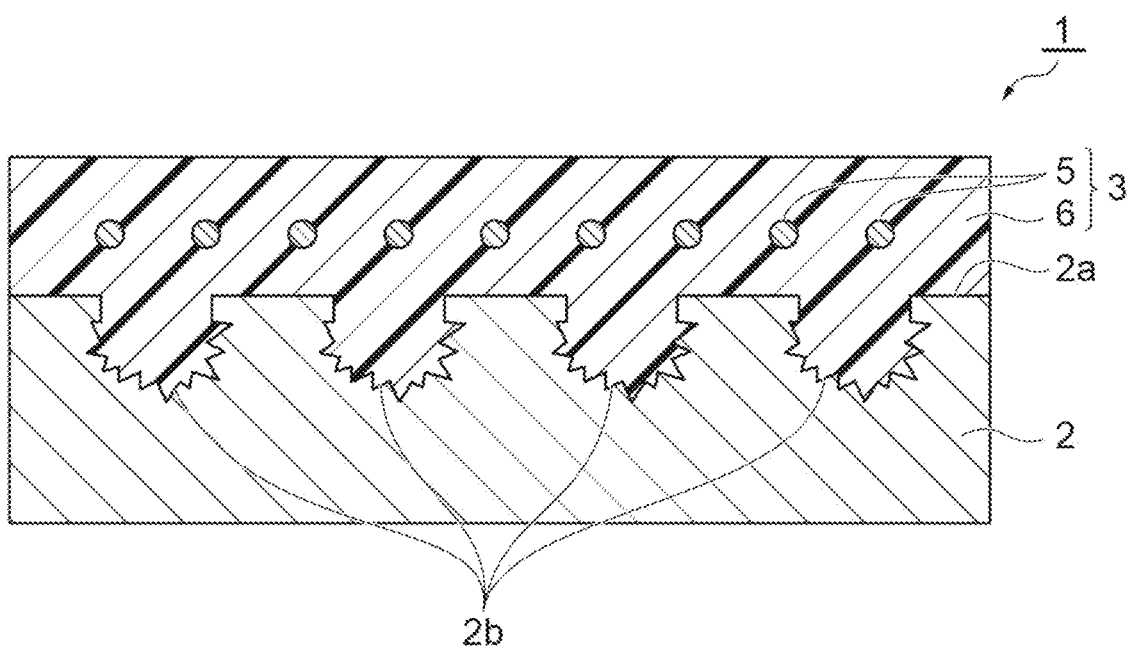
FIG. 2 is a cross-sectional view of the composite member taken along line II-II of FIG. 1.

FIG. 2 is a cross-sectional view of the composite member 1 taken along line II-II of FIG. 1. As illustrated in FIG. 2, the metallic member 2 has asperities 2$b$ on a part of a surface 2$a$ of the metallic member 2. The asperities 2$b$ are micro-order or nano-order asperities. The micro-order asperities are asperities having a height difference of 1 μm to less than 1000 μm. The nano-order asperities are asperities having a height difference of 1 nm to less than 1000 nm. As a more specific example, on a part of the surface 2$a$, an arithmetic mean roughness Ra, a maximum height Ry, and a ten-point mean roughness Rz, which are defined by JIS B0601 (1994), may be set at 0.2 μm or more and 5.0 μm or less, 1.0 μm or more and 30.0 μm or less, and 1.0 μm or more and 20.0 μm or less, respectively. If the arithmetic mean roughness Ra, the maximum height Ry, and the ten-point mean roughness Rz are set in the ranges, the asperities 2$b$ have a sufficient anchor effect on the fiber-reinforced resin member 3. Thus, bonding strength between the metallic member 2 and the fiber-reinforced resin member 3 increases.

It was found that higher bonding strength is obtained when an arithmetic mean inclination RΔa defined by JIS B0601 (1994) is controlled. As a specific example, the arithmetic mean inclination RΔa may be 0.17 or more and 0.50 or less. The smaller the arithmetic mean inclination RΔa, the lower the bonding strength. If the arithmetic mean inclination RΔa is smaller than 0.17, it is difficult to obtain practical bonding strength. As the arithmetic mean inclination RΔa increases, processing conditions for forming the asperities 2$b$ need to be controlled at a higher level. Thus, if the arithmetic mean inclination RΔa is larger than 0.50, the productivity may decrease. If the asperities 2$b$ are formed by blasting, which will be described later, it is difficult to perform blasting such that the arithmetic mean inclination RΔa exceeds 0.50.

Furthermore, it was found that higher bonding strength is obtained when a root-mean-square inclination RΔq is controlled in addition to the arithmetic mean inclination RΔa. As a specific example, the root-mean-square inclination RΔq may be 0.27 or more and 0.60 or less. The smaller the root-mean-square inclination RΔq, the lower the bonding strength. If the root-mean-square inclination RΔq is smaller than 0.27, it is difficult to obtain practical bonding strength. As the root-mean-square inclination RΔq increases, the processing conditions for forming the asperities 2$b$ need to be controlled at a higher level. Thus, if the root-mean-square inclination RΔq is larger than 0.60, the productivity may decrease. If the asperities 2$b$ are formed by blasting, which will be described later, it is difficult to perform blasting such that the root-mean-square inclination RΔq exceeds 0.60.

The fiber-reinforced resin member 3 partially applied into the asperities 2$b$ is bonded to the metallic member 2. The fiber-reinforced resin member 3 is hardened in the asperities 2$b$ and thus produces an anchor effect. Such a structure is formed, for example, by tape placement molding or ultrasonic continuous welding, which will be described later. The fiber-reinforced resin member 3 is composed of fiber parts 5 and the resin part 6. The material of the fiber parts 5 is a fiber, for example, an aromatic polyamide fiber, a carbon fiber, or a glass fiber. The material of the resin part 6 is a resin, for example, polyamide. The material of the resin part 6 may be a resin, for example, polybutylene terephthalate, polyphenylene sulfide, a liquid crystal polymer, polypropylene, or acrylonitrile-butadiene-styrene. For example, a prepreg in which the fiber parts 5 are impregnated with the resin part 6 in a half-cured state is stacked, and then heat and a pressure are applied to the prepreg, so that the fiber-reinforced resin member 3 is produced.

The composite member 1 includes the fiber-reinforced resin member 3 containing, for example, a compound having a fluorene skeleton. The compound having the fluorene skeleton is, for example, 9,9-bis(hydroxyphenyl) fluorene, 9,9-bis(alkyl-hydroxyphenyl) fluorene, or 9,9-bis(hydroxy-alkoxy phenyl) fluorene. In the composite member 1, for example, a compound having a fluorene skeleton is contained with a mass equivalent to 1% or more and 15% or less of the mass of the resin part 6 of the fiber-reinforced resin member 3.

The function of the composite member 1 is evaluated by the shearing strength before and after a temperature change impact test. The temperature change impact test is a test in which the composite member 1 is heated from −40° C. to 140° C. and is kept at 140° C. for 30 minutes, and then the composite member 1 is cooled from 140° C. to −40° C. and is kept at −40° C. for 30 minutes. This cycle is performed 300 times. The detail of the temperature change impact test will be described later. After the temperature change impact test is conducted, the shearing strength in the composite member 1 is reduced only by 15.4% or less as compared with the shearing strength before the temperature change impact test is conducted.

As described above, the composite member 1 according to the present embodiment has the asperities 2$b$ on the surface 2$a$ of the metallic member 2 that is in direct contact with the fiber-reinforced resin member 3, thereby producing the anchor effect. Hence, the composite member 1 has high bonding strength. Moreover, the composite member 1 is formed by bonding the metallic member 2 and the fiber-reinforced resin member 3 at a proper temperature, so that after the temperature change impact test, a reduction in shearing strength can be suppressed to 15.4% or less as compared with the shearing strength before the temperature change impact test. Thus, according to the composite member 1, a reduction in bonding strength can be suppressed, the reduction being caused by a difference in coefficient of thermal expansion between the members. If an impact is applied to the composite member 1, the fiber-reinforced resin member 3 is firmly bonded to the metallic member 2, so that the fiber parts 5 in the fiber-reinforced resin member 3 are broken before the fiber-reinforced resin member 3 peels off from the metallic member 2. This absorbs the impact on the composite member 1. Hence, the composite member 1 in which the fiber-reinforced resin member 3 is bonded has higher impact absorption than a composite member in which a resin member not containing the fiber parts 5 is bonded. Such high impact absorption is provided in a part where the fiber-reinforced resin member 3 is bonded. Thus, a modification of the metallic member 2 can be controlled according to the bonded part of the fiber-reinforced resin member 3.

The composite member 1 includes the fiber-reinforced resin member 3 containing the compound having the fluorene skeleton. The compound having the fluorene skeleton is contained in the resin part 6 of the fiber-reinforced resin member 3, thereby reducing the melting viscosity of the resin part 6 of the fiber-reinforced resin member 3 and improving flowability during melting. Hence, the transfer of the fiber-reinforced resin member 3 improves with higher adhesion when the fiber-reinforced resin member 3 is molded on the surface of the metallic member 2. Furthermore, adhesion between the fiber parts 5 and the resin part 6 improves, thereby increasing the strength of the fiber-reinforced resin member 3. The resin part 6 of the fiber-reinforced resin member 3 melts at a low temperature after the compound having the fluorene skeleton is added to the resin part 6. Thus, heating to a high temperature is suppressed when the metallic member 2 and the fiber-reinforced resin member 3 are bonded to each other, so that the composite member 1 is hardly deformed or peeled off by the expansion and shrinkage of the metallic member 2 and the fiber-reinforced resin member 3. Thus, according to the composite member 1, a reduction in bonding strength can be suppressed, the reduction being caused by a difference in coefficient of thermal expansion between the members.

In the composite member 1, an arithmetic mean inclination on the surface of the metallic member 2 having the asperities $2b$ is 0.17 or more and 0.50 or less. By using the metallic member 2 having the surface with an arithmetic mean inclination of 0.17 or more and 0.50 or less, the surface area of the metallic member 2 increases, allowing the composite member 1 to properly obtain an anchor effect.

[Method of Manufacturing the Composite Member]

Figure 3:
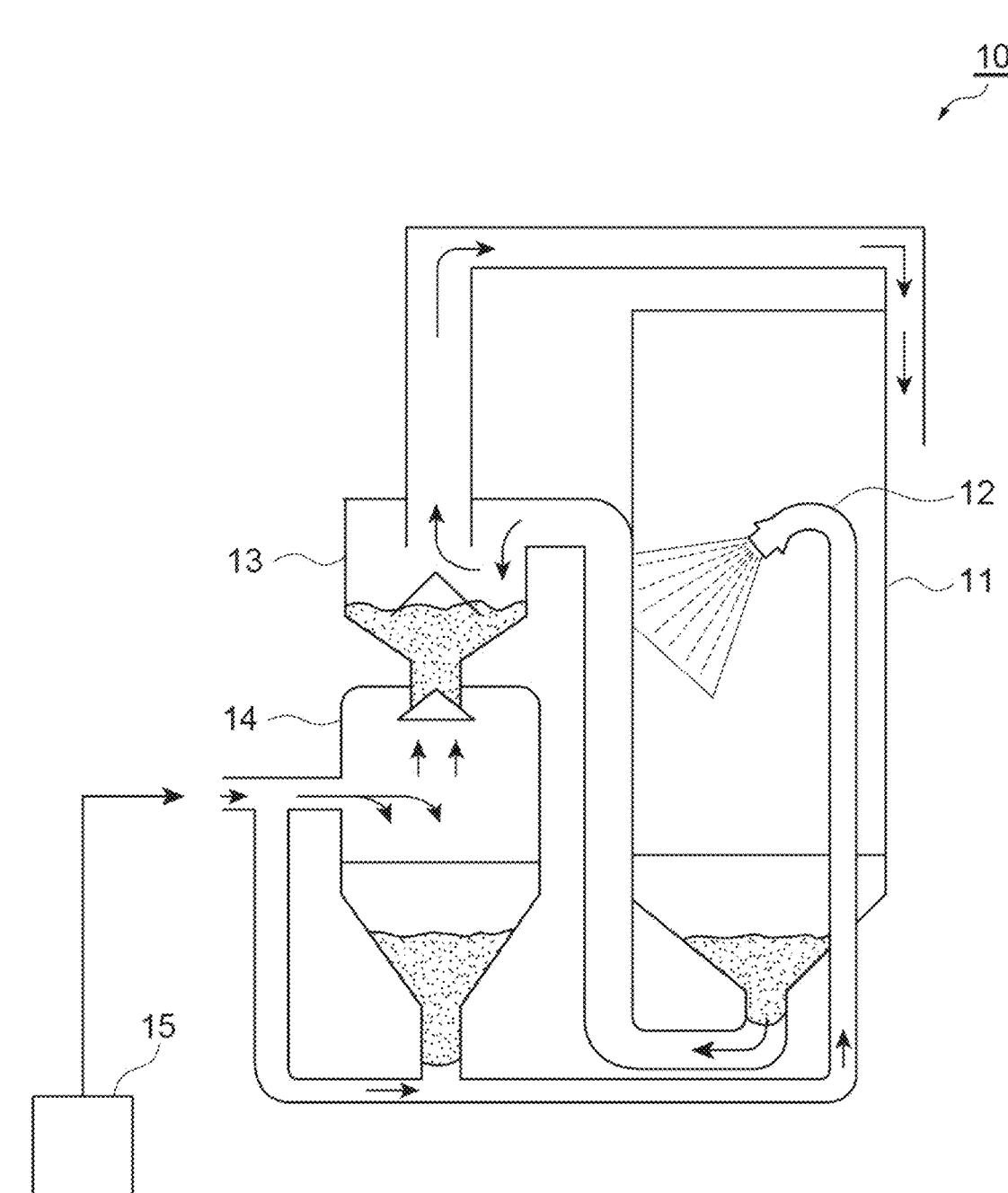
FIG. 3 is a conceptual diagram illustrating a blasting machine used for a method of manufacturing the composite member according to the embodiment.

The outline of a machine used for the method of manufacturing the composite member 1 will be described below. First, a machine for performing blasting will be described below. Blasting is surface treatment for forming micro-order or nano-order asperities on the surface of the metallic member 2. The surface treatment is a process for roughening the surface of the metallic member 2. The blasting machine may be any type of a gravity (suction) air-blast machine, a straight-hydraulic (pressure) air-blast machine, and a centrifugal blasting machine. In the manufacturing method according to the present embodiment, a so-called straight-hydraulic (pressure) air-blast machine is used as an example. FIG. 3 is a conceptual diagram illustrating a blasting machine 10 used for the method of manufacturing the composite member 1. The blasting machine 10 includes a blast chamber 11, a blast nozzle 12, a storage tank 13, a pressure chamber 14, a compressed-air feeder 15, and a dust collector (not illustrated).

The blast nozzle 12 is stored in the blast chamber 11 and blasting is performed on a workpiece (metallic member 2) in the blast chamber 11. A blast material from the blast nozzle 12 falls with dust to the bottom of the blast chamber 11. The fallen blast material is fed into the storage tank 13 and the dust is fed into the dust collector. The blast material stored in the storage tank 13 is fed into the pressure chamber 14 and then the pressure chamber 14 is pressurized by the compressed-air feeder 15. The blast material stored in the pressure chamber 14 is fed with compressed air into the blast nozzle 12. In this way, the workpiece undergoes blasting while the blast material is circulated.

Figure 4:
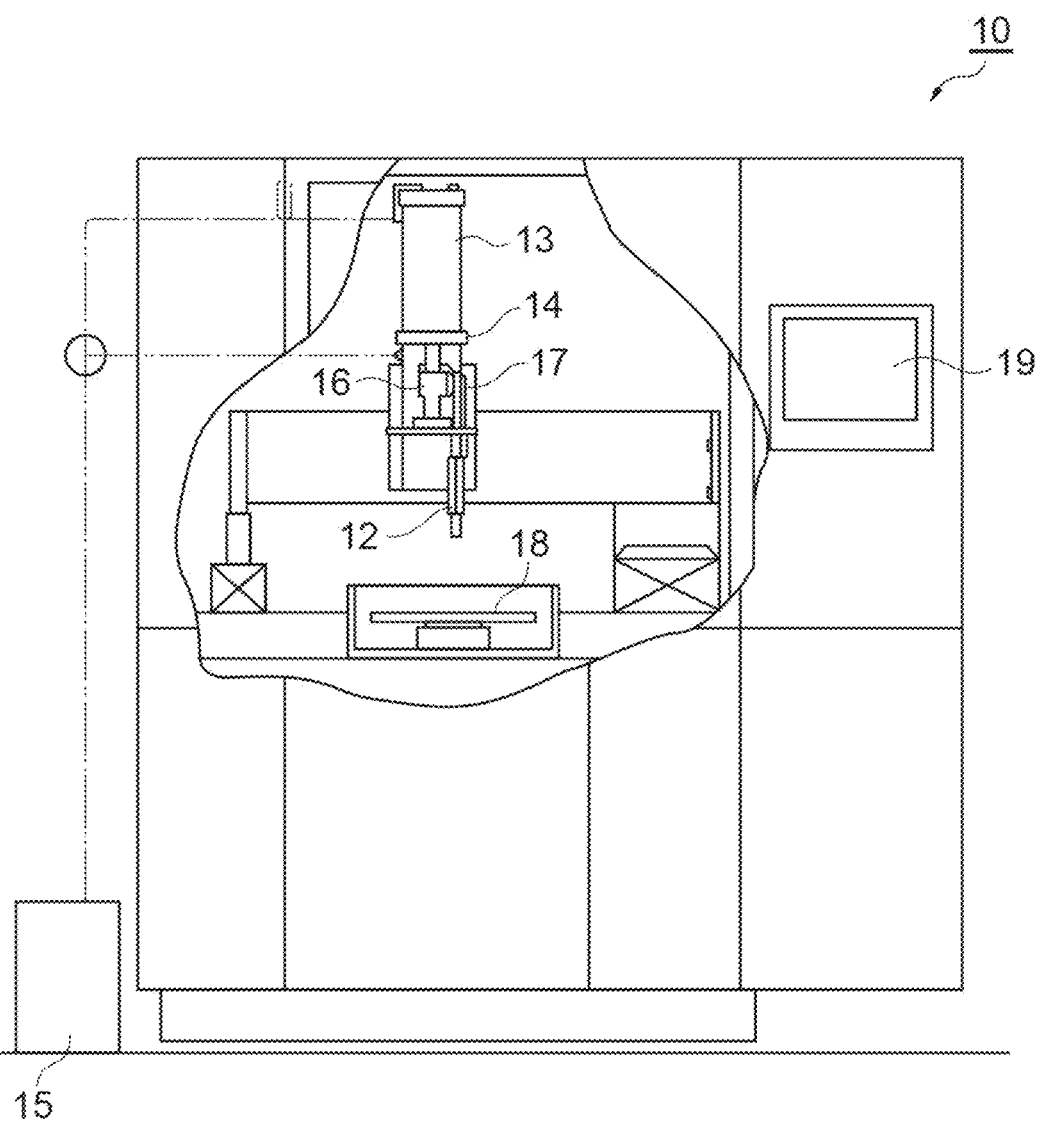
FIG. 4 is an explanatory drawing illustrating the configuration of the blasting machine used for the method of manufacturing the composite member according to the embodiment.

FIG. 4 is an explanatory drawing illustrating the configuration of the blasting machine 10 used for the method of manufacturing the composite member 1 according to the embodiment. The blasting machine 10 in FIG. 4 is the straight-hydraulic blasting machine illustrated in FIG. 3. In FIG. 4, the wall surface of the blast chamber 11 is partially omitted.

As illustrated in FIG. 4, the blasting machine 10 includes the blast-material storage tank 13 and the pressure chamber 14 that are connected to the compressed-air feeder 15 and have sealed structures, a fixed-quantity feeding part 16 communicating with the storage tank 13 in the pressure chamber 14, the blast nozzle 12 communicating with the fixed-quantity feeding part 16 via a connecting pipe 17, a work table 18 that can move while holding a workpiece below the blast nozzle 12, and a control unit 19.

The control unit 19 controls the constituent elements of the blasting machine 10. The control unit 19 includes, for example, a display unit and a processing unit. The processing unit is a typical computer including a CPU and a storage unit. The control unit 19 controls a feed rate from the compressed-air feeder 15 that feeds compressed air to the storage tank 13 and the pressure chamber 14 based on a set blast pressure and a set blast velocity. Moreover, the control unit 19 controls the position of a blast from the blast nozzle 12 based on a distance between the set workpiece and the nozzle and the scanning conditions (including a speed, a feed pitch, and the number of scans) of the workpiece. As a specific example, the control unit 19 controls the position of the blast nozzle 12 by using a scanning speed (X direction) and a feed pitch (Y direction) that are set before blasting. The control unit 19 controls the position of the blast nozzle 12 by moving the work table 18 holding the workpiece.

Figure 5:
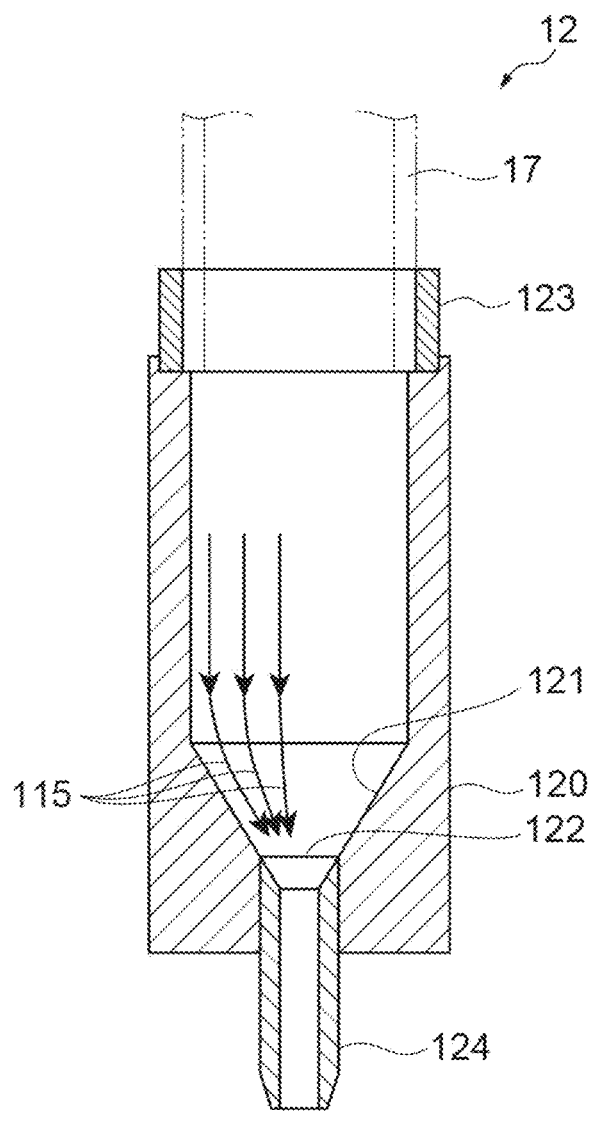
FIG. 5 is a cross-sectional view of a blast nozzle illustrated in FIG. 4.

FIG. 5 is a cross-sectional view of the blast nozzle 12 illustrated in FIG. 4. The blast nozzle 12 has a blast-tube holder 120 serving as a body part. The blast-tube holder 120 is a cylindrical member having a space for passing the blast material and compressed air therein. One end of the blast-tube holder 120 is a blast-material inlet port 123 and the other end of the blast-tube holder 120 is a blast-material outlet port 122. The blast-tube holder 120 includes a convergence acceleration part 121 that is conical with an angle of tilt, the convergence acceleration part 121 having an inner wall surface tapering from the blast-material inlet port 123 toward the blast-material outlet port 122. A cylindrical blast tube 124 communicates with the blast-material outlet port 122 of the blast-tube holder 120. The convergence acceleration part 121 tapers from the midpoint of the cylindrical shape of the blast-tube holder 120 toward the blast tube 124. This forms a compressed airflow 115.

The connecting pipe 17 of the blasting machine 10 is connected to the blast-material inlet port 123 of the blast nozzle 12. This forms a blast material passage that sequentially connects the storage tank 13, the fixed-quantity feeding part 16 in the pressure chamber 14, the connecting pipe 17, and the blast nozzle 12.

In the blasting machine 10 configured thus, compressed air is fed from the compressed-air feeder 15 to the storage tank 13 and the pressure chamber 14 after the quantity of compressed air is controlled by the control unit 19. Subsequently, the blast material in the storage tank 13 is quantitatively determined by the fixed-quantity feeding part 16 in the pressure chamber 14 with a constant pressure flow force, the blast material is fed into the blast nozzle 12 through the connecting pipe 17, and then the blast material is directed from the blast tube of the blast nozzle 12 onto the work surface of the workpiece. Thus, a fixed quantity of the blast material is always directed onto the work surface of the workpiece. Subsequently, the position of a blast directed from the blast nozzle 12 onto the work surface of the workpiece is controlled by the control unit 19 and then the workpiece undergoes blasting.

The directed blast material and cut powder generated by blasting are sucked by the dust collector, which is not illustrated. On a passage from the blast chamber 11 to the dust collector, a classifier, which is not illustrated, is disposed to separate a reusable blast material and other fine powder (blast material not in a reusable size or cut powder generated by blasting). The reusable blast material is stored in the storage tank 13 and then is fed into the blast nozzle 12 again. The fine powder is collected by the dust collector.

Figure 6:
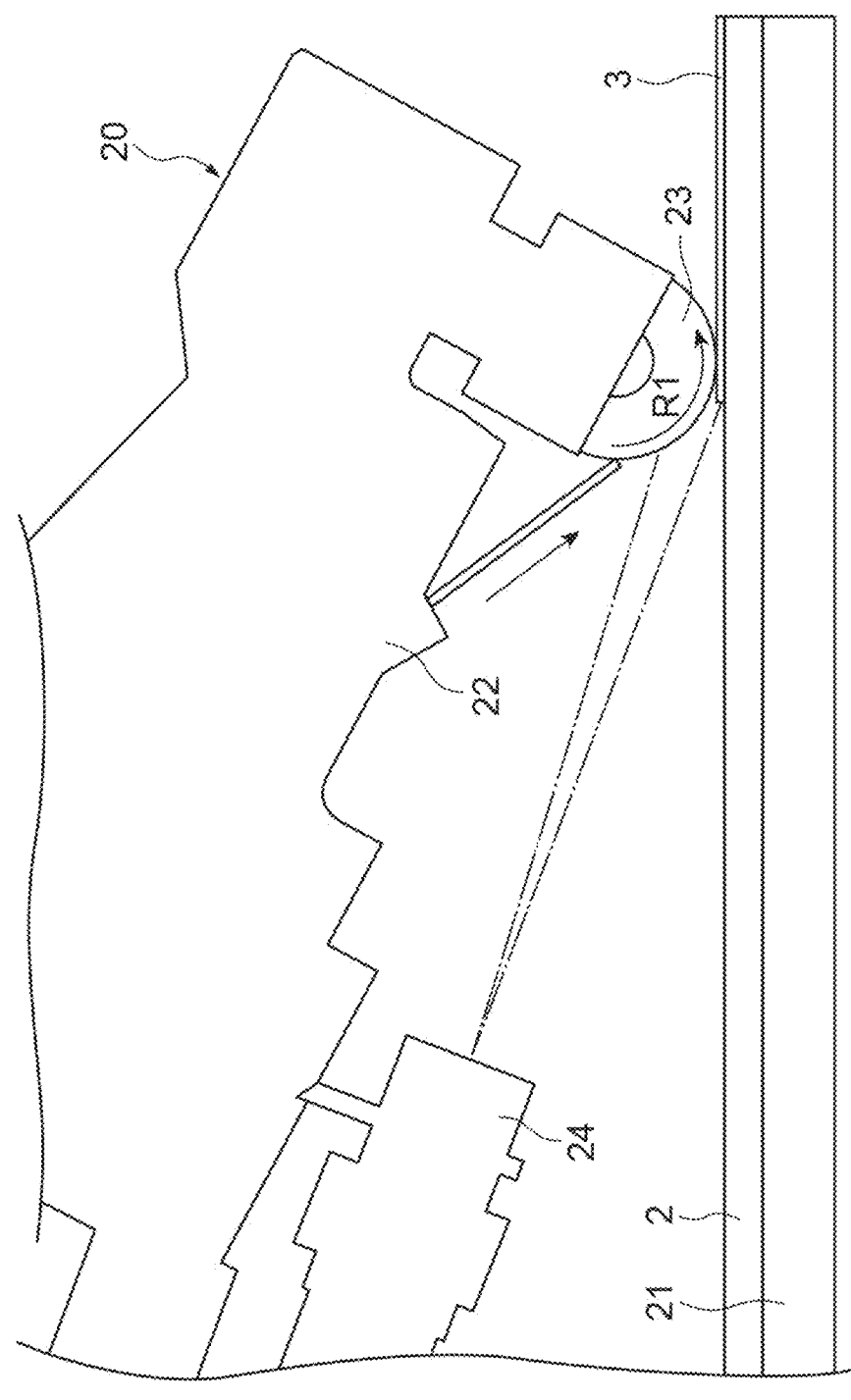
FIG. 6 is a partially enlarged view of a molding device used for tape placement molding.

Tape placement molding (Automated Tape Laying (ATL)/ Automated Fiber Placement (AFP)) will be described below. The tape placement molding is a molding method that directly molds a fiber-reinforced resin member (prepreg tape) on a surface of a metallic member while applying heat and a pressure to the fiber-reinforced resin member. The tape placement molding of the present embodiment joins the metallic member 2 and the fiber-reinforced resin member 3 by bonding the fiber-reinforced resin member 3 to the metallic member 2 on a loading table while applying heat and a pressure to a part of the tape-like fiber-reinforced resin member 3. In the tape placement molding, while the tape-like fiber-reinforced resin member 3 is partially melted, a melted portion of the fiber-reinforced resin member 3 is bonded to the surface of the metallic member 2. This process is repeated to directly bond the metallic member 2 and the fiber-reinforced resin member 3. FIG. 6 is a partially enlarged view of a molding device used for tape placement molding. As illustrated in FIG. 6, a molding device 20 is provided above a loading table 21. The metallic member 2 is placed on the loading table 21. The molding device 20 can control the temperature of the loading table 21. The loading table 21 adjusts the surface temperature of the metallic member 2. The loading table 21 can cool the metallic member 2 by, for example, air cooling, water cooling, or a heat sink and heat the metallic member 2 by a heater or the like. The molding device 20 controls the temperature of the loading table 21 such that the temperature of a metallic surface is, for example, 23° C. (room temperature) or more and 100° C. or less.

The molding device 20 includes a resin feeding unit 22, a pressing unit 23, and a laser radiation unit 24. The resin feeding unit 22 feeds the tape-like (belt-like) fiber-reinforced resin member 3 with a predetermined amount and thickness to the pressing unit 23. The pressing unit 23 has a cylindrical rotator that can rotate about the rotation axis and move near the metallic member 2 on the loading table 21. The pressing unit 23 winds the fiber-reinforced resin member 3 from the resin feeding unit 22 toward the loading table 21 (in the direction of an arrow R1 in FIG. 6) according to a rotation of the rotator. The pressing unit 23 feeds the wound fiber-reinforced resin member 3 to the metallic member 2 at the bottom of the rotator and presses the tape-like fiber-reinforced resin member 3 to the metallic member 2 while rotating. The laser radiation unit 24 radiates a laser beam to the fiber-reinforced resin member 3 wound by the pressing unit 23. For example, the laser radiation unit 24 radiates a laser beam to the fiber-reinforced resin member 3 having moved close to the bonded surface 4 of the metallic member 2.

The molding device 20 includes a moving device that is not illustrated. The moving device can move at least the pressing unit 23 to the loading table 21 and adjusts a distance between the pressing unit 23 and the metallic member 2 on the loading table 21 and a position with respect to the extending direction of the metallic member 2. For example, in FIG. 6, when the fiber-reinforced resin member 3 is fed to the metallic member 2, the moving device moves the pressing unit 23 toward the laser radiation unit 24. The pressing unit 23 rotates according to a movement by the moving device, presses (applies a pressure) the fiber-reinforced resin member 3 to the metallic member 2 on the loading table 21, and winds the fiber-reinforced resin member 3 fed from the resin feeding unit 22. The fiber-reinforced resin member 3 is heated and melted by a laser beam radiated by the laser radiation unit 24, so that the fiber-reinforced resin member 3 pressed to the surface of the metallic member 2 by the pressing unit 23 comes into contact with the asperities 2b. Based on the detection results of a temperature sensor and a pressure sensor, which are not illustrated, the parameters of the molding device 20 are adjusted to manufacture molded articles. The parameters include a surface temperature of the metallic member 2, a surface temperature of the fiber-reinforced resin member 3, a pressure of the pressing unit 23, a rotation speed of the rotator of the pressing unit 23, and a moving speed of the moving device. The molding device 20 can form a layer of the fiber-reinforced resin member 3 on the metallic member 2 by feeding the tape-like fiber-reinforced resin member 3 to the metallic member 2. The fiber-reinforced resin member 3 heated by a laser beam is not heated outside the range of laser radiation by the laser radiation unit 24 and is cooled to room temperature. The molding device 20 further feeds the fiber-reinforced resin member 3 onto the layer of the fiber-reinforced resin member 3 to form a layer of the fiber-reinforced resin member 3 having a predetermined thickness. The article molded by the molding device 20 has a lap joint structure that is joined with a predetermined area.

Figure 7:
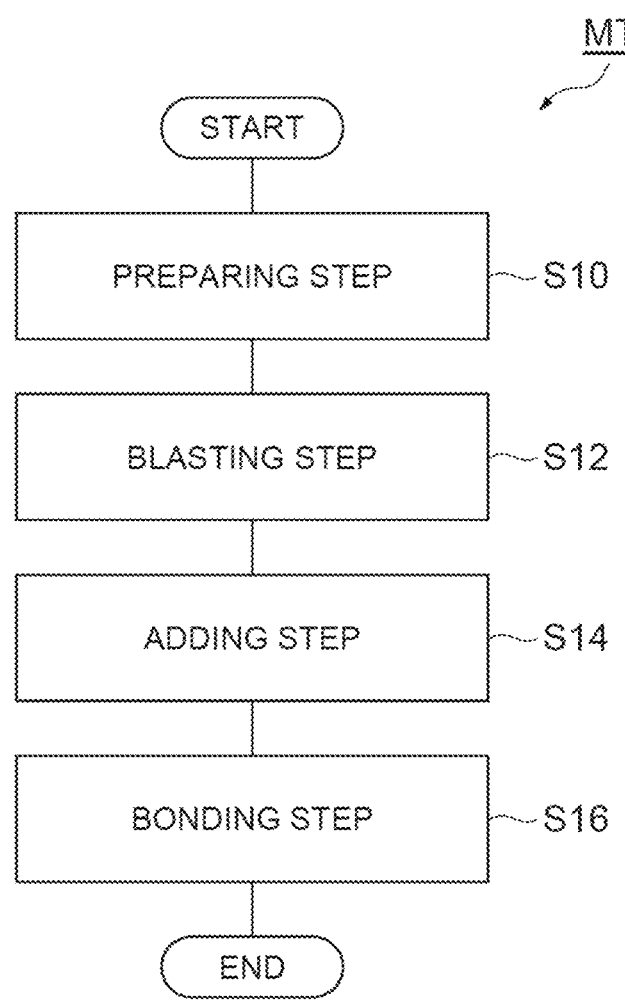
FIG. 7 is a flowchart of the method of manufacturing the composite member according to the embodiment.

The flow of the method of manufacturing the composite member 1 will be described below. FIG. 7 is a flowchart of a manufacturing method MT of the composite member 1 according to the embodiment. As depicted in FIG. 7, first, a predetermined blast material is charged into the blasting machine 10 as a preparing step (S10). The particle size of the blast material (abrasive grains) is, for example, 30 μm to 300 μm. The smaller the particle size of the blast material, the smaller mass of the blast material. This leads to a small inertial force. Thus, if the particle size of the blast material is smaller than 30 μm, it is difficult to form the asperities 2b in desired shapes. The larger the particle size of the blast material, the larger mass of the blast material. This leads to a large inertial force. Hence, the blast material is likely to be crushed by a collision with the metallic member 2. This leads to the following problems: (1) poor working efficiency caused by the dispersion of collision energy in a process other than the formation of the asperities 2b and (2) high cost because the blast material considerably wears. Such problems become apparent when the particle size exceeds 300 μm.

The control unit 19 of the blasting machine 10 acquires blasting conditions as the preparing step (S10). The control unit 19 acquires the blasting conditions based on an operation by an operator or information stored in the storage unit. The blasting conditions include a blast pressure, a blast velocity, a distance between nozzles, and workpiece scanning conditions (a speed, a feed pitch, and the number of scans). The blast pressure is, for example, 0.5 MPa or more and 2.0 MPa or less. The lower the blast pressure, the smaller the inertial force. Thus, if the blast pressure is smaller than 0.5 MPa, it is difficult to form the asperities 2b in desired shapes. The higher the blast pressure, the larger the inertial force. Hence, the blast material is likely to be crushed by a collision with the metallic member 2. This leads to the following problems: (1) poor working efficiency caused by the dispersion of collision energy in a process other than the formation of the asperities 2b and (2) high cost because the blast material considerably wears. Such problems become apparent when the blast pressure exceeds 2.0 MPa. The control unit 19 precisely performs micro-order or nano-order control on the size, depth, and density of the asperities 2b on the surface 2a of the metallic member 2 by managing the blasting conditions. The blasting conditions may include a condition for specifying a blasting region. In this case, selective surface treatment is achieved.

Figure 8:
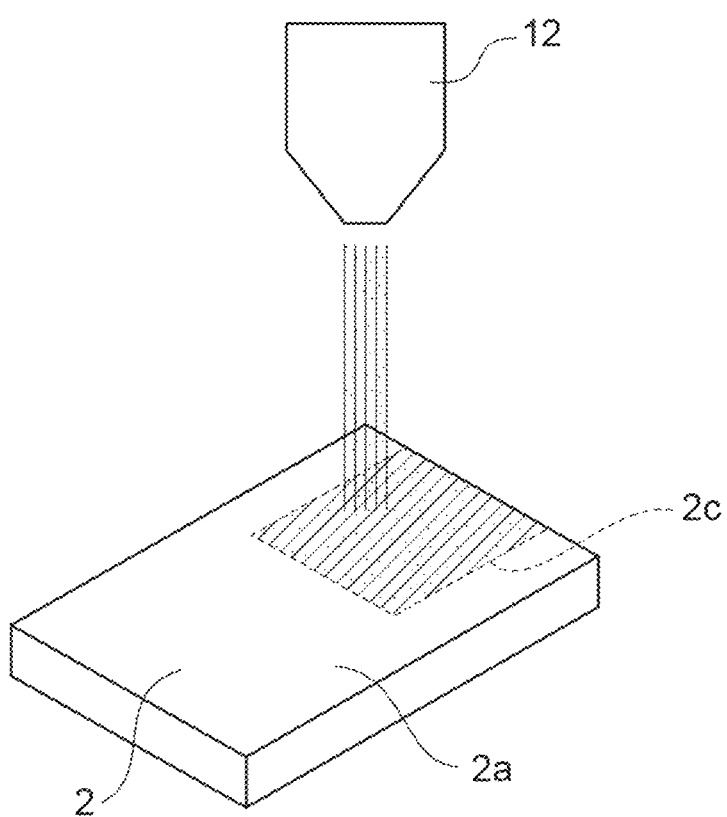
FIG. 8 is a conceptual diagram of blasting.
Figure 9:
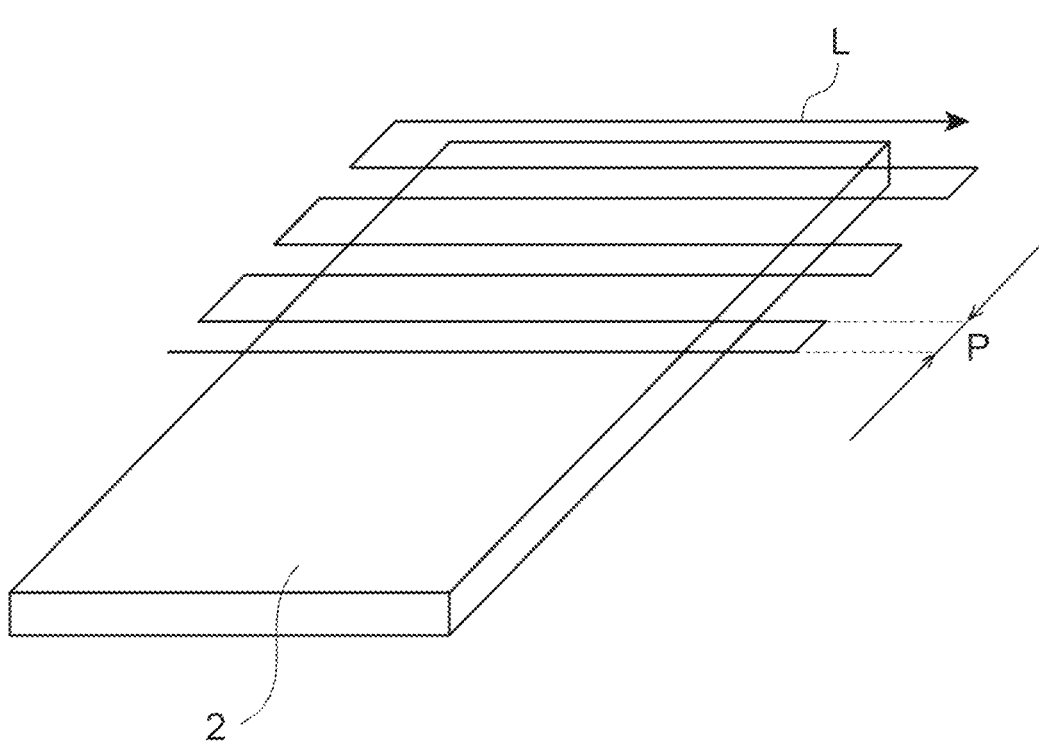
FIG. 9 is an explanatory drawing of a scan of blasting.

Subsequently, the blasting machine 10 performs a series of processing as the blasting step (S12) as follows: first, the metallic member 2 that is a target of blasting is set on the work table 18 in the blast chamber 11. The control unit 19 then activates the dust collector, which is not illustrated. The dust collector reduces a pressure in the blast chamber 11 to a negative pressure based on the control signal of the control unit 19. Thereafter, based on the control signal of the control unit 19, the blast nozzle 12 sends a blast of the blast material as a solid/gas two-phase flow of compressed air at a blast pressure of 0.5 MPa or more and 2.0 MPa or less. The control unit 19 then activates the work table 18 and moves the metallic member 2 into a blast flow of the solid/gas two-phase flow (below the blast nozzle in FIG. 4). FIG. 8 is a conceptual diagram of blasting. As illustrated in FIG. 8, the blast material is jetted from the blast nozzle 12 to a partial region 2c of the surface 2a of the metallic member 2. At this point, the control unit 19 continuously activates the work table 18 such that a blast flow draws a predetermined path on the metallic member 2. FIG. 9 is an explanatory drawing of a scan of blasting. As illustrated in FIG. 9, the control unit 19 operates the work table 18 according to a path L for scanning with a feed pitch P. FIG. 10A-10C are an explanatory drawings of the manufacturing process of the composite member. As illustrated in FIG. 10A, the micro-order or nano-order asperities 2b are formed on the surface of the metallic member 2 as desired.

By blasting using the blast material having a particle size of 30 μm or more and 300 μm or less at a blast pressure of 0.5 MPa or more and 2.0 MPa or less, the micro-order or nano-order asperities 2b are formed on the surface 2a of the metallic member 2 as desired (for example, the asperities 2b having an arithmetic mean inclination RΔa and a root-mean-square inclination RΔq that are controlled to 0.17 or more and 0.50 or less and 0.27 or more and 0.60 or less, respectively). After the operation of the blasting machine 10 is stopped, the metallic member 2 is removed and blasting is completed.

Subsequently, as an adding step (S14), an additive is added to the fiber-reinforced resin member 3. The additive contains a compound having a fluorene skeleton. The compound having the fluorene skeleton is, for example, 9,9-bis (hydroxyphenyl) fluorene, 9,9-bis(alkyl-hydroxyphenyl) fluorene, or 9,9-bis(hydroxyalkoxy phenyl) fluorene. In the adding step (S14), for example, the compound is added such that a compound having a fluorene skeleton is contained with a mass equivalent to 1% or more and 15% or less of the mass of the resin part 6 of the fiber-reinforced resin member 3. The completion of the addition of the compound reduces the melting viscosity of the resin part 6 of the fiber-reinforced resin member 3 and improves flowability during melting.

Subsequently, as a bonding step (S16), tape placement molding is performed by using the molding device 20. First, the metallic member 2 having undergone blasting is placed on the loading table 21. The molding device 20 feeds the fiber-reinforced resin member 3 from the resin feeding unit 22 to the pressing unit 23. The molding device 20 radiates a laser beam from the laser radiation unit 24 to the fiber-reinforced resin member 3 wound by the pressing unit 23 and partially melts the fiber-reinforced resin member 3. The molding device 20 controls the temperature of the fiber-reinforced resin member 3 wound by the pressing unit 23 to a set value based on the detection result of the temperature sensor, which is not illustrated. The molding device 20 adjusts the surface temperature of the metallic member 2 by controlling the temperature of the loading table 21 based on the detection result of the temperature sensor, which is not illustrated, such that the surface temperature of the metallic member 2 does not exceed a predetermined temperature. The molding device 20 further controls a pressure of the pressing unit 23 to the metallic member 2 to a set value based on the detection result of the pressure sensor, which is not illustrated. Thereafter, the molding device 20 feeds the tape-like fiber-reinforced resin member 3 to the metallic member 2 based on the set temperature and pressure and the moving speed of the moving device. The fiber-reinforced resin member 3 supplied onto the surface of the metallic member 2 is melted and thus enters the asperities 2b. The fiber-reinforced resin member 3 supplied onto the surface of the metallic member 2 is cooled, hardened, and bonded to the metallic member 2. As illustrated in FIG. 10B, a layer of the fiber-reinforced resin member 3 is formed on the surface of the metallic member 2. The molding device 20 feeds and stacks the fiber-reinforced resin member 3 onto the fiber-reinforced resin member 3 such that the fiber-reinforced resin members 3 have a predetermined thickness. As illustrated in FIG. 10C, a plurality of layers of the fiber-reinforced resin member 3 are formed on the surface of the metallic member 2. The molding device 20 repeatedly stacks the fiber-reinforced resin member 3 until the fiber-reinforced resin members 3 have a predetermined thickness. After the thickness of the fiber-reinforced resin members 3 reaches the predetermined thickness, the molding device 20 separates the pressing unit 23 from the loading table 21 by using the moving device and removes the composite member 1 in which the metallic member 2 and the fiber-reinforced resin member 3 are integrated with each other. At the completion of the bonding step (S16), the flowchart in FIG. 7 is completed.

As described above, according to the manufacturing method MT of the composite member 1, the micro-order or nano-order asperities 2b are formed on the surface 2a of the metallic member 2 in the blasting step (S12) that is an example of surface treatment. In the bonding step (S16), the fiber-reinforced resin member 3 is partially melted and is bonded to the surface of the metallic member 2. The fiber-reinforced resin member 3 is applied into the asperities 2b formed on the surface of the metallic member 2 and is hardened therein, producing an anchor effect. In the bonding step (S16), a location of melting is limited to a part of the fiber-reinforced resin member 3, thereby suppressing heating of the overall metallic member 2 to a high temperature. A small temperature change over the metallic member 2 before and after the bonding step (S16) reduces expansion and shrinkage of the metallic member 2, thereby reducing the influence of the thermal expansion of the metallic member 2 on the deformation of the composite member 1. By repeating partial melting and bonding on the fiber-reinforced resin member 3, the fiber-reinforced resin member 3 is gradually bonded to the surface of the metallic member 2 in a continuous manner. The fiber-reinforced resin member 3 and the metallic member 2 are sequentially cooled from the bonded portions, and the bonded portions sequentially return to the dimensions before heating. Thus, the influence of a difference in thermal expansion between the fiber-reinforced resin member 3 and the metallic member 2 on the deformation of the composite member 1 becomes partial and temporary influence, and bonding is gradually performed while reducing the difference in thermal expansion. This reduces deformation on the composite member 1 as compared with the case in which the fiber-reinforced resin member is entirely melted and then is bonded to the entire surface of the metallic member at a time. As described above, the manufacturing method MT can suppress the occurrence of deformation and exfoliation on the composite member 1 even if a difference in coefficient of thermal expansion is made between the metallic member 2 and the fiber-reinforced resin member 3. Thus, according to the manufacturing method MT, a reduction in bonding strength can be suppressed, the reduction being caused by a difference in coefficient of thermal expansion between the members. If an impact is applied to the composite member 1, the fiber-reinforced resin member 3 is firmly bonded to the metallic member 2, so that the fiber parts 5 in the fiber-reinforced resin member 3 are broken before the fiber-reinforced resin member 3 peels off from the metallic member 2. This absorbs the impact on the composite member 1. Hence, the composite member 1 in which the fiber-reinforced resin member 3 is bonded has higher impact absorption than a composite member in which a resin member not containing the fiber parts 5 is bonded. Such high impact absorption is provided in a part where the fiber-reinforced resin member 3 is bonded. Thus, a modification of the metallic member 2 can be controlled according to the bonded part of the fiber-reinforced resin member 3.

According to the manufacturing method MT, in the bonding step (S16), the fiber-reinforced resin member 3 is directly bonded to the surface of the metallic member 2 by tape placement molding. In this case, a mold for placing the metallic member 2 and the fiber-reinforced resin member 3 is not necessary, so that heat is not applied to the overall metallic member 2 or the overall fiber-reinforced resin member 3. Specifically, only a location of laser radiation from the laser radiation unit 24 by the molding device 20 is partially heated. Thus, by controlling the location of radiation of the laser radiation unit 24, a location of melting is limited to a part of the fiber-reinforced resin member 3, thereby minimizing the range of heating on the metallic member 2. Hence, heating of the overall metallic member 2 to a high temperature is suppressed. The partially melted fiber-reinforced resin member 3 is gradually bonded to the surface of the metallic member 2 in a continuous manner by a movement and a pressure of the pressing unit 23. The fiber-reinforced resin member 3 bonded to the surface of the metallic member 2 and the metallic member 2 are moved out of the location of radiation of the laser radiation unit 24 by a movement of the molding device 20 and thus are sequentially cooled from the bonded portions, and the bonded portions sequentially return to the dimensions before heating. Thus, the influence of a difference in thermal expansion between the fiber-reinforced resin member 3 and the metallic member 2 on the deformation of the composite member 1 becomes partial and temporary influence, and bonding is gradually performed while reducing the difference in thermal expansion. This reduces deformation on the composite member 1 as compared with the case in which the fiber-reinforced resin member is entirely melted and then is bonded to the entire surface of the metallic member at a time. As described above, the manufacturing method MT can suppress the occurrence of deformation and exfoliation on the composite member 1 even if a difference in coefficient of thermal expansion is made between the metallic member 2 and the fiber-reinforced resin member 3. Since a mold is not necessary, the degree of freedom in designing of the manufactured composite member 1 increases.

In this method, if press forming is used in the bonding step, the temperature of a mold to store the metallic member and the fiber-reinforced resin member is, for example, about 220° C. If injection molding is used in the bonding step, the temperature of a mold to store the metallic member is about 50° C. or more and about 160° C. or less, and the heating temperature of the fiber-reinforced resin member is about 230° C. or more and 300° C. or less. In this way, in press forming and injection molding, the metallic member and the fiber-reinforced resin member are bonded while being expanded and heated to a high temperature. When the composite member is cooled to room temperature, the metallic member shrinks, thereby increasing an internal residual stress. Shearing strength is reduced by an internal residual stress, and a reduction in strength, in particular, increases after a temperature change impact test, which will be described later. Thus, deformation may occur on the composite member molded at a high temperature and lead to exfoliation on a bonded interface between the metallic member and the resin member. Hence, as compared with press forming and injection molding, the occurrence of deformation and exfoliation on the composite member 1 can be suppressed according to the manufacturing method MT using tape placement molding.

In the following example, soft adhesive or hard adhesive is applied to the surface of the metallic member in the bonding step and the fiber-reinforced resin member is bonded to a surface of the adhesive. The soft adhesive is, for example, acrylic. The soft adhesive has flexibility, and the adhesive has the function of reducing a displacement caused by the influence of a difference in coefficient of thermal expansion between the metallic member and the fiber-reinforced resin member. However, the shearing strength of the composite member molded with the soft adhesive is lower than that of the composite member 1 according to the present embodiment. The hard adhesive is, for example, epoxy or urethane. The hard adhesive is resistant to an external force and has the function of keeping the high shearing strength of the composite member. However, the adhesive cannot reduce a displacement caused by the influence of a difference in coefficient of thermal expansion between the metallic member and the fiber-reinforced resin member. Furthermore, only a few adhesives are compatible with both of the metallic member and the fiber-reinforced resin member (have high bonding strength). Hence, as compared with a bonding method using an adhesive, the manufacturing method MT using tape placement molding can obtain high shearing strength in the composite member 1 while suppressing the occurrence of deformation and exfoliation on the composite member 1. Since the manufacturing method MT stacks the tape-like fiber-reinforced resin member 3, the specifications of the composite member 1 (the thickness of the fiber-reinforced resin member 3) can be changed during the process, thereby increasing the degree of freedom in designing of the composite member 1.

According to the manufacturing method MT, the adding step (S14) of adding a compound having a fluorene skeleton to the fiber-reinforced resin member 3 is further included. In the bonding step (S16), the fiber-reinforced resin member 3 to which the compound is added in the adding step (S14) is directly bonded to the surface of the metallic member 2 by continuously molding the partially melted fiber-reinforced resin member 3 on the surface of the metallic member 2. In the adding step (S14), the compound having the fluorene skeleton is added to the fiber-reinforced resin member 3, thereby reducing, for example, the melting viscosity of the resin part 6 of the fiber-reinforced resin member 3 and improving flowability during melting. Hence, the transfer of the fiber-reinforced resin member 3 improves with higher adhesion when the fiber-reinforced resin member 3 is molded on the surface of the metallic member 2 in the bonding step (S16). Furthermore, adhesion between the fiber parts 5 and the resin part 6 improves, thereby increasing the strength of the fiber-reinforced resin member 3. The resin part 6 of the fiber-reinforced resin member 3 to which the compound having the fluorene skeleton is added or the fiber-reinforced resin member 3 to which the compound having the fluorene skeleton is added melts at a low temperature. Thus, heating of the metallic member 2 and the fiber-reinforced resin member 3 to a high temperature is suppressed in the bonding step (S16). Thus, according to the manufacturing method MT of the composite member 1, the occurrence of deformation and exfoliation on the composite member 1 can be suppressed, the deformation and exfoliation being caused by expansion and shrinkage of the metallic member 2 and the fiber-reinforced resin member 3. This can further suppress a reduction in bonding strength, the reduction being caused by a difference in coefficient of thermal expansion between the members.

According to the manufacturing method MT, an arithmetic mean inclination on the surface of the metallic member 2 having the asperities 2b is 0.17 or more and 0.50 or less in the blasting step (S12) that is an example of surface treatment. In this case, in the blasting step (S12), the asperities are formed such that an arithmetic mean inclination on the surface of the metallic member 2 is 0.17 or more and 0.50 or less. The manufacturing method MT of the composite member 1 can increase the surface area of the metallic member 2, thereby properly obtaining the anchor effect of the composite member 1.

According to the manufacturing method MT, the surface treatment may be the blasting step (S12) in which the asperities 2b are formed by blasting. In this case, the surface structure of the bonded surface 4 can be quantitatively controlled unlike in other surface treatment techniques for bonding the members, thereby performing surface treatment at low cost in a short time.

The present embodiment was described above. As a matter of course, the present disclosure is not limited to the present embodiment and can be modified in various forms other than the present embodiment without departing from the scope of the disclosure.

[Modification of the Base Material and the Fiber-Reinforced Resin Member]

The metallic member 2 and the fiber-reinforced resin member 3 were described as plate members in the embodiment. The shapes are not limited and any shapes can be used as long as the members can be brought into contact with each other. The fiber-reinforced resin member 3 according to the embodiment is in contact with a part of the surface of the metallic member 2. The fiber-reinforced resin member 3 may be brought into contact with the overall surface of the metallic member 2.

[Modification of Surface Treatment]

In the manufacturing method of the composite member 1, the surface treatment is not limited to the blasting step (S12) and various surface treatments may be performed instead. An example of other surface treatments is chemical etching or laser beam machining. Chemical etching is a process of forming fine shapes on the surface of the metallic member by chemical etching. Laser beam machining is a process of forming fine shapes on the surface of the metallic member by laser beam machining.

[Modification of Treatment Before Bonding]

Before the bonding step (S16) is performed, predetermined treatment may be performed on the metallic member 2. For example, as a surface hydroxylation step before the bonding step (S16) is performed, the surface of the metallic member 2 having undergone blasting may be caused to react with water by using at least one of heat and plasma and the surface of the metallic member 2 may be modified into aluminum hydroxide. In the surface hydroxylation step, the surface of the metallic member 2 is caused to react with water by using one of hydrothermal treatment, steam treatment, superheated steam treatment, liquid plasma, and atmospheric-pressure plasma containing water. Thus, the asperities 2b are rounded and an aluminum hydroxide film is formed. The aluminum hydroxide film contains aluminum hydroxide and can form a surface nano structure on the surfaces of the asperities 2b. The fiber-reinforced resin member 3 is directly bonded to the surface of the metallic member 2 modified to aluminum hydroxide. The fiber-reinforced resin member 3 is applied into the rounded asperities 2b and is hardened therein. As described above, sharp projections that may break the fiber-reinforced resin member 3 can be removed by the surface hydroxylation step, thereby improving the bonding strength of the composite member 1. Moreover, on the surface of the metallic member 2, an oxygen atom of a hydroxyl group and a hydrogen atom contained in the fiber-reinforced resin member 3 mainly form a hydrogen bond. Thus, a chemical bond is formed between the surface of the metallic member 2 and the fiber-reinforced resin member 3, thereby improving the bonding strength. Furthermore, the surface of the metallic member 2 has pores measuring several tens nm or more and several hundreds nm or less. This enhances the anchor effect.

In the surface hydroxylation step, the surface of the metallic member 2 may be cleaned with water. The surface of the metallic member 2 is cleaned with water, thereby reducing a surface carbon concentration. Hydrothermal treatment and ultrasonic cleaning may be combined to positively reduce the surface carbon concentration. For example, pure water is irradiated with ultrasonic waves while the metallic member 2 is immersed in the pure water heated to at least 60° C. This can simultaneously perform hydrothermal treatment and surface washing. When the surface hydroxylation step is performed, the particle size of the blast material (abrasive grains) prepared in the preparing step (S10) may be, for example, 30 μm or more and 710 μm or less.

For example, as coating formation before the bonding step (S16) is performed, a molecular binder may be applied onto the surfaces of the asperities 2b of the metallic member 2 in such a way as to form a coating bonded to the metallic member 2. The molecular binder is, for example, a binder containing a triazine thiol derivative. The coating formation can be performed, for example, after the surface hydroxylation step. In this case, three effects are combined as follows: the formation of the coating into the asperities 2b on the surface of the metallic member 2, the formation of the coating into the surface nano structure with a contact surface area extended between the metallic member 2 and the coating by the surface nano structure on the surface layers of the asperities 2b, and molecular bonding between a functional group on the surfaces of the asperities 2b and the triazine thiol derivative contained in the coating. An organic combination of these three configurations produces a synergy effect, which cannot be obtained by simply adding the effects of the individual configurations, achieving strong bonding. The fiber-reinforced resin member 3 is strongly bonded by molecular bonding between a functional group on the surface and the triazine thiol derivative contained in the coating.

[Modification of Bonding]

For example, in the bonding step (S16), the laser radiation unit 24 may radiate a laser beam to the surface of the metallic member 2 near the pressing unit 23. When the fiber-reinforced resin member 3 is pressed to the surface of the metallic member 2 by the pressing unit 23, the fiber-reinforced resin member 3 pressed to the surface of the metallic member 2 is heated and melted by heating the surface of the metallic member 2, so that the fiber-reinforced resin member 3 is pressed into contact with the asperities 2b. For example, the laser radiation unit 24 may radiate laser beams to the surface of the metallic member 2 near the pressing unit 23 and the fiber-reinforced resin member 3 having moved close to the bonded surface 4 of the metallic member 2. The range of laser radiation by the laser radiation unit 24 stays in a partial range with respect to the welding position of the fiber-reinforced resin member 3 on the surface of the metallic member 2. Hence, heating of the overall metallic member 2 and the overall fiber-reinforced resin member 3 by a laser beam of the laser radiation unit 24 is suppressed.

In the manufacturing method of the composite member 1, in the bonding step (S16), a method of partially melting and continuously molding the fiber-reinforced resin member 3 on the surface of the metallic member 2 is not limited. For example, in the bonding step (S16), the fiber-reinforced resin member 3 may be directly bonded to the surface of the metallic member 2 by ultrasonic continuous welding instead of tape placement molding. In this case, the molding device 20 may be provided without the laser radiation unit 24. For example, the pressing unit 23 has the function of ultrasonically vibrating the fiber-reinforced resin member 3. The pressing unit 23 is, for example, an ultrasonic horn. The molding device 20 heats the fiber-reinforced resin member 3 fed from the resin feeding unit 22 to the pressing unit 23, by ultrasonic vibrations. The pressing unit 23 presses the heated and melted fiber-reinforced resin member 3 to the surface of the metallic member 2. In other words, the fiber-reinforced resin member 3 is heated and melted by ultrasonic vibrations immediately before being pressed to the surface of the metallic member 2, thereby suppressing heating of the surface of the metallic member 2 and other fiber-reinforced resin members 3. Thus, ultrasonic continuous welding is performed such that the fiber-reinforced resin member 3 heated by ultrasonic vibrations is partially melted and is continuously molded on the surface of the metallic member 2. The method of manufacturing the composite member by ultrasonic continuous welding has the same effect as the method of manufacturing the composite member by tape placement molding. Specifically, only an ultrasonically vibrated location on the pressing unit 23 is partially heated. Thus, by controlling, for example, the output of ultrasonic waves in the pressing unit 23, a location of melting is limited to a part of the fiber-reinforced resin member 3, thereby minimizing the range of heating on the metallic member 2. Hence, heating of the overall metallic member 2 to a high temperature is suppressed. The partially melted fiber-reinforced resin member 3 is gradually bonded to the surface of the metallic member 2 in a continuous manner by a movement and a pressure of the pressing unit 23. The fiber-reinforced resin member 3 bonded to the surface of the metallic member 2 and the metallic member 2 are moved out of the ultrasonically vibrated location of the pressing unit 23 by a movement of the molding device 20 and thus are sequentially cooled from the bonded portions, and the bonded portions sequentially return to the dimensions before heating. Thus, the influence of a difference in thermal expansion between the fiber-reinforced resin member 3 and the metallic member 2 on the deformation of the composite member 1 becomes partial and temporary influence, and bonding is gradually performed while reducing the difference in thermal expansion. This reduces deformation on the composite member 1 as compared with the case in which the fiber-reinforced resin member is entirely melted and then is bonded to the entire surface of the metallic member at a time. As described above, the manufacturing method MT can suppress the occurrence of deformation and exfoliation on the composite member 1 even if a difference in coefficient of thermal expansion is made between the metallic member 2 and the fiber-reinforced resin member 3. Since a mold is not necessary, the degree of freedom in designing of the manufactured composite member 1 increases. As compared with press forming and injection molding, ultrasonic continuous welding can suppress the occurrence of deformation and exfoliation on the composite member 1. The pressing unit 23 may be configured to press with a roller instead of an ultrasonic horn.

For example, in the bonding step (S16), the molding device 20 may avoid further feeding the fiber-reinforced resin member 3 onto the layer of the fiber-reinforced resin member 3 fed on the surface of the metallic member 2. The molding device 20 may stack the fiber-reinforced resin member 3 not containing a compound having a fluorene skeleton on the fiber-reinforced resin member 3 that contains a compound having a fluorene skeleton and is fed on the surface of the metallic member 2. In this case, on the surface of the metallic member 2 that is likely to deform and peel off in the composite member 1, the metallic member 2 and the fiber-reinforced resin member 3 containing a compound having a fluorene skeleton are bonded to each other, thereby keeping high shearing strength with high adhesion.

EXAMPLES

[Confirmation of Shearing Strength Before and After Temperature Change Impact Test]

FIG. 11 is an explanatory drawing of the results of temperature change impact tests according to examples. As indicated in FIG. 11, examples 1 to 10 and comparative examples 1 to 6 were prepared to confirm shearing strengths before and after temperature change impact tests.

Example 1

The blasting step (S12) was performed by using the blasting machine illustrated in FIGS. 3 to 5. An aluminum plate (JIS: A5052) was used as a metallic member. The aluminum plate was set to have dimensions: 25 mm (L) 200 mm (W) 1.6 mm (T). The blast material containing alumina with an abrasive-grain center particle size of 106 μm to 125 μm was used for blasting. The blast pressure was 1.0 MPa. Subsequently, the adding step (S14) was performed. CFRTP was used for the fiber-reinforced resin member. The matrix resin of the fiber-reinforced resin member (the material of the resin part) is, for example, polyamide 6 (PA6), and the material of the fiber parts is carbon fiber (CF). Added to polyamide 6 as an additive with a mass equivalent to 5% of the mass of polyamide 6 was OGSOL MF-11 by Osaka Gas Chemicals Co., Ltd. Thereafter, the bonding step (S16) was performed. The fiber-reinforced resin member was bonded to the metallic member by using the molding device 20 capable of ultrasonic continuous welding and the loading table 21. Without heating the metallic member placed on the loading table 21, the surface of the metallic member was set to 23° C. (room temperature). The resin feeding unit 22 of the molding device 20 fed the tape-like fiber-reinforced resin member having a width of 12 mm and a thickness of 90 μm to the pressing unit 23. The molding device 20 stacked the 15 tape-like fiber-reinforced resin members on the metallic member. A part where the metallic member and the fiber-reinforced resin member are bonded to each other was set to have dimensions: 12 mm (L) 25 mm (W). The bonding method in the bonding step (S16) is ultrasonic continuous welding. The pressing unit 23 applies a pressure to the surface of the metallic member with a roller while heating the fiber-reinforced resin member by ultrasonic vibrations. As a device for performing ultrasonic continuous welding, SW1000LS by adwelds corporation was used. The ultrasonic frequency was 20 kHz, and a roller pressure on the pressing unit 23 was 300 N. The speed of moving the pressing unit 23 by the moving device relative to the loading table 21 was 10 mm/s.

Example 2

In example 2, an aluminum plate (JIS: A5052) having undergone the same blasting step (S12) as in example 1 was used as a metallic member. In example 2, CFRTP having undergone the same adding step (S14) as in example 1 was used as a fiber-reinforced resin member. In the bonding step (S16) of example 2, the surface of the metallic member placed on the loading table 21 was heated to 80° C. Other conditions in the bonding step (S16) of example 2 were identical to those of example 1.

Example 3

In example 3, an aluminum plate (JIS: A5052) having undergone the same blasting step (S12) as in example 1 was used as a metallic member. In example 3, CFRTP having undergone the same adding step (S14) as in example 1 was used as a fiber-reinforced resin member. In the bonding step (S16) of example 3, the fiber-reinforced resin member was bonded to the metallic member by using the molding device 20 capable of tape placement molding and the loading table 21. Without heating the metallic member placed on the loading table 21, the surface of the metallic member was set to 23° C. (room temperature). The resin feeding unit 22 of the molding device 20 fed the tape-like fiber-reinforced resin member having a width of 12 mm and a thickness of 90 μm to the pressing unit 23. The molding device 20 stacked the 15 tape-like fiber-reinforced resin members on the metallic member. A part where the metallic member and the fiber-reinforced resin member are bonded to each other was set to have dimensions: 12 mm (L) 25 mm (W). The bonding method in the bonding step (S16) is tape placement molding. The pressing unit 23 applies a pressure to the surface of the metallic member with a roller while heating the fiber-reinforced resin member with the laser radiation unit 24. In the laser radiation unit 24, the laser output was 4 kW and the laser wavelength was 1060 nm. A device for tape placement molding has the same specifications as the molding device 20 illustrated in FIG. 6. A roller pressure on the pressing unit 23 was 370 N. The speed of moving the pressing unit 23 by the moving device relative to the loading table 21 was 25 mm/s.

Example 4

In example 4, an aluminum plate (JIS: A5052) having undergone the same blasting step (S12) as in example 1 was used as a metallic member. In example 4, CFRTP having undergone the same adding step (S14) as in example 1 was used as a fiber-reinforced resin member. In the bonding step (S16) of example 4, the surface of the metallic member placed on the loading table 21 was heated to 80° C. Other conditions in the bonding step (S16) of example 4 were identical to those of example 3.

Example 5

In example 5, an aluminum plate (JIS: A5052) having undergone the same blasting step (S12) as in example 1 was used as a metallic member. In example 5, as a fiber-reinforced resin member, CFRTP was used in which polyamide 6 having not undergone the adding step (S14) is used as matrix resin (resin part) and carbon fiber (CF) is used as the fiber part. The bonding step (S16) of example 5 was identical to that of example 1.

Example 6

In example 6, cold-rolled steel (JIS: SPCC) was used as a metallic member. The conditions of the blasting step (S12) performed on the metallic member were identical to those of example 1. In example 6, CFRTP having undergone the same adding step (S14) as in example 1 was used as a fiber-reinforced resin member. The bonding step (S16) of example 6 was identical to that of example 1.

Example 7

In example 7, an aluminum plate (JIS: A5052) having undergone the same blasting step (S12) as in example 1 was used as a metallic member. In example 7, as a fiber-reinforced resin member, GFRTP was used in which polyamide 6 is used as matrix resin (resin part) and glass fiber (GF) is used as the fiber part. The same adding step (S14) as in example 1 was performed on the matrix resin of the fiber-reinforced resin member of example 7. The bonding step (S16) of example 7 was identical to that of example 1.

Example 8

In example 8, an aluminum plate (JIS: A5052) having undergone the same blasting step (S12) as in example 1 was used as a metallic member. In example 8, as a fiber-reinforced resin member, CFRTP was used in which polyphenylene sulfide (PPS) having not undergone the adding step (S14) is used as matrix resin (resin part) and carbon fiber (CF) is used as the fiber part. The bonding step (S16) of example 8 was identical to that of example 1.

Example 9

In example 9, an aluminum plate (JIS: A5052) having undergone the same blasting step (S12) as in example 1 was used as a metallic member. In example 9, as a fiber-reinforced resin member, CFRTP was used in which polyether ether ketone resin (PEEK) having not undergone the adding step (S14) is used as matrix resin (resin part) and carbon fiber (CF) is used as the fiber part. The bonding step (S16) of example 9 was identical to that of example 1.

Example 10

In example 10, an aluminum plate (JIS: A5052) having undergone the same blasting step (S12) as in example 1 was used as a metallic member. In example 10, as a fiber-reinforced resin member, CFRTP was used in which polybutylene terephthalate (PBT) having not undergone the adding step (S14) is used as matrix resin (resin part) and carbon fiber (CF) is used as the fiber part. The bonding step (S16) of example 10 was identical to that of example 1.

Comparative Example 1

In comparative example 1, an aluminum plate (JIS: A5052) having undergone the same blasting step (S12) as in example 1 was used as a metallic member. In comparative example 1, CFRTP having undergone the same adding step (S14) as in example 1 was used as a fiber-reinforced resin member. In the bonding step (S16) of comparative example 1, the surface of the metallic member placed on the loading table 21 was heated to 150° C. Other conditions in the bonding step (S16) of comparative example 1 were identical to those of example 1.

Comparative Example 2

In comparative example 2, an aluminum plate (JIS: A5052) having undergone the same blasting step (S12) as in example 1 was used as a metallic member. In comparative example 2, CFRTP having undergone the same adding step (S14) as in example 1 was used as a fiber-reinforced resin member. In the bonding step (S16) of comparative example 2, the surface of the metallic member placed on the loading table 21 was heated to 150° C. Other conditions in the bonding step (S16) of comparative example 2 were identical to those of example 3.

Comparative Example 3

In comparative example 3, an aluminum plate (JIS: A5052) having undergone the same blasting step (S12) as in example 1 was used as a metallic member. In comparative example 3, CFRTP having not undergone the same adding step (S14) was used as a fiber-reinforced resin member as in example 5. In the bonding step (S16) of comparative example 3, the metallic member and the fiber-reinforced resin member were bonded by injection molding. Insert molding was used as the injection molding. In the insert molding, the metallic member was placed as an insert component into a predetermined mold, the mold was heated, carbon fiber (CF) was placed into the mold, melted resin (polyamide 6) was injected into the mold and was retained for a predetermined time to mold the fiber-reinforced resin member, and then the metallic member and the fiber-reinforced resin member were hardened. At this point, the mold was heated such that the temperature of the mold reaches 140° C. during the injection of the resin. Thus, the surface of the metallic member placed in the mold can be heated to at least about 140° C. During the injection, the injection rate was 20 mm/s, the injection pressure was 53 MPa or more and 93 MPa or less, and the injection time was 0.56 s. During the retention, the retention pressure was 80 MPa and the retention time was 8 s. Other conditions of comparative example 3 were identical to those of example 5.

Comparative Example 4

In comparative example 4, an aluminum plate (JIS: A5052) having undergone the same blasting step (S12) as in example 1 was used as a metallic member. In comparative example 4, CFRTP having not undergone the same adding step (S14) was used as a fiber-reinforced resin member as in example 5. In the bonding step (S16) of comparative example 4, the metallic member and the fiber-reinforced resin member were bonded by press forming. During the retention time of the press forming (the closing of the mold), the mold temperature was 220° C., the retention pressure was 5 MPa, and the retention time was 300 s. Thus, the surface of the metallic member placed in the mold can be heated to at least about 220° C. Other conditions of comparative example 4 were identical to those of example 5.

Comparative Example 5

In comparative example 5, an aluminum plate (JIS: A5052) having not undergone the blasting step (S12) was used as a metallic member. In comparative example 5, CFRTP having undergone the same adding step (S14) as in example 1 was used as a fiber-reinforced resin member. The bonding step (S16) of comparative example 5 was identical to that of example 1.

Comparative Example 6

In comparative example 6, an aluminum plate (JIS: A5052) having not undergone the blasting step (S12) was used as a metallic member. In comparative example 6, as a fiber-reinforced resin member, CFRTP was used in which polyamide 6 having not undergone the adding step (S14) is used as matrix resin (resin part) and carbon fiber (CF) is used as the fiber part. The bonding step (S16) of comparative example 6 was identical to that of example 1.

[Temperature Change Impact Test]

Temperature change impact tests were conducted for examples 1 to 10 and comparative examples 1 to 6 that were prepared under the foregoing conditions. The conducted temperature change impact tests are compliant with JASO D 014-4:2014 (Automotive parts-Environmental conditions and testing for electrical and electronic equipment—Part 4: Climatic loads) that is equivalent to ISO 16750-4. In the temperature change impact tests, a minimum temperature $T_{min}$ was set at −40° C. and a maximum temperature $T_{max}$ was set at 140° C. as an operating temperature range. Examples 1 to 10 and comparative examples 1 to 6 are changed from the minimum temperature $T_{min}$ to the maximum temperature $T_{max}$, and then the maximum temperature $T_{max}$ was kept for 30 minutes. Thereafter, examples 1 to 10 and comparative examples 1 to 6 are changed again from the maximum temperature $T_{max}$ to the minimum temperature $T_{min}$, and then the minimum temperature $T_{min}$ was kept for 30 minutes. This process is performed in one cycle, and 300 cycles were performed as test cycles.

[Evaluation of Bonding Strength]

Shearing strengths were measured for examples 1 to 10 and comparative examples 1 to 6 that were prepared under the foregoing conditions. An evaluation apparatus conducted measurements according to a testing method in conformity with ISO19095. Before the temperature change impact tests were conducted, the shearing strength of example 1 was 42 MPa, the shearing strength of example 2 was 40 MPa, the shearing strength of example 3 was 40 MPa, the shearing strength of example 4 was 39 MPa, the shearing strength of example 5 was 32 MPa, the shearing strength of example 6 was 39 MPa, the shearing strength of example 7 was 36 MPa, the shearing strength of example 8 was 39 MPa, the shearing strength of example 9 was 43 MPa, and the shearing strength of example 10 was 40 MPa. Before the temperature change impact tests were conducted, the shearing strength of comparative example 1 was 38 MPa, the shearing strength of comparative example 2 was 38 MPa, the shearing strength of comparative example 3 was 30 MPa, and the shearing strength of comparative example 4 was 31 MPa. In comparative example 5 and comparative example 6, the metallic member and the fiber-reinforced resin member were not bonded to each other, so that shearing strength was not measured.

After the temperature change impact tests were conducted, the shearing strength of example 1 was 40 MPa, the shearing strength of example 2 was 35 MPa, the shearing strength of example 3 was 38 MPa, the shearing strength of example 4 was 33 MPa, the shearing strength of example 5 was 30 MPa, the shearing strength of example 6 was 36 MPa, the shearing strength of example 7 was 34 MPa, the shearing strength of example 8 was 36 MPa, the shearing strength of example 9 was 39 MPa, and the shearing strength of example 10 was 37 MPa. After the temperature change impact tests were conducted, the shearing strength of comparative example 1 was 25 MPa, the shearing strength of comparative example 2 was 24 MPa, the shearing strength of comparative example 3 was 19 MPa, and the shearing strength of comparative example 4 was 22 MPa. In comparative example 5 and comparative example 6, the metallic member and the fiber-reinforced resin member were not bonded to each other before the temperature change impact tests, so that shearing strengths were not measured after the temperature change impact tests.

Rates of decrease were calculated. A rate of decrease indicates the ratio of the shearing strength of the composite member after the temperature change impact test to the shearing strength of the composite member before the temperature change impact test. The rate of decrease is a value that is represented as the percentage of a value obtained by dividing a difference between the shearing strength of the composite member before the temperature change impact test and the shearing strength of the composite member after the temperature change impact test by the shearing strength of the composite member before the temperature change impact test. The rate of decrease of example 1 was 4.8%, the rate of decrease of example 2 was 12.5%, the rate of decrease of example 3 was 5.0%, the rate of decrease of example 4 was 15.4%, the rate of decrease of example 5 was 6.3%, the rate of decrease of example 6 was 7.7%, the rate of decrease of example 7 was 5.6%, the rate of decrease of example 8 was 7.7%, the rate of decrease of example 9 was 9.3%, and the rate of decrease of example 10 was 7.5%. The rate of decrease of comparative example 1 was 34.2%, the rate of decrease of comparative example 2 was 36.8%, the rate of decrease of comparative example 3 was 36.7%, and the rate of decrease of comparative example 4 was 29.0%. In comparative example 5 and comparative example 6, the metallic member and the fiber-reinforced resin member were not bonded to each other before the temperature change impact tests, so that the rates of decrease were not calculated.

By comparing examples 1 and 2 with comparative example 1, it was confirmed that a temperature decrease on the surface of the metallic member in the bonding step (S16), in which ultrasonic continuous welding is performed, contributes greatly to the improvement of shearing strength before and after the temperature change impact test. By comparing examples 3 and 4 with comparative example 2, it was confirmed that a temperature decrease on the surface of the metallic member in the bonding step (S16), in which tape placement molding is performed, contributes greatly to the improvement of shearing strength before and after the temperature change impact test. Furthermore, it was confirmed that in the bonding step (S16), in which ultrasonic continuous welding or tape placement molding is performed, the surface of the metallic member has a high temperature (150° C. in comparative examples 1 and 2), so that the rate of decrease of the shearing strength is 30% or more after the temperature change impact test. Moreover, it was confirmed that in the bonding step (S16), the surface of the metallic member does not have a high temperature (23° C. and 80° C. in examples 1 to 4), so that the rate of decrease of the shearing strength is suppressed to less than 16% (15.4% or less) after the temperature change impact test. According to the results of examples 1 to 4 and comparative examples 1 and 2, it was confirmed that an significant difference was not found between ultrasonic continuous welding and tape placement molding as the bonding methods of the metallic member and the fiber-reinforced resin member in the bonding step (S16), and in both of the bonding methods, high shearing strength is obtained before and after the temperature change impact test by preventing the surface of the metallic member from reaching a high temperature.

By comparing example 1 and example 5, in example 1 in which the adding step (S14) is performed, the shearing strength before and after the temperature change impact test is slightly larger and the rate of decrease is smaller than in example 5 in which the adding step (S14) is not performed. This is because the additive added in the adding step (S14) improves the flowability of the fiber-reinforced resin member and the adhesion of the fiber-reinforced resin member to the metallic member and thus improves the shearing strength. By comparing examples 2 and 5 with comparative example 1, it was confirmed that in example 5 in which the adding step (S14) is not performed, the shearing strength before and after the temperature change impact test is larger and the rate of decrease is smaller than in example 2 and comparative example 1, in which the temperature on the surface of the metallic member in the bonding step (S16) is higher than in example 5. Thus, it was confirmed that a high temperature on the surface of the metallic member contributes more greatly to a reduction in shearing strength as compared with the presence or absence of the additive.

By comparing example 5 with comparative examples 3 and 4, it was confirmed that in the bonding step (S16) in which ultrasonic continuous welding is performed, the shearing strength is larger and the rate of decrease is smaller before and after the temperature change impact test than in the bonding step in which injection molding or press forming is performed. Since the temperatures of molds are high in comparative examples 3 and 4 (140° C. and 220° C. in comparative examples 3 and 4, respectively), the surface of the metallic member and the overall metallic member may be heated to high temperatures by the molds. According to the results of example 5 and comparative examples 3 and 4, it was confirmed that an significant difference was found between ultrasonic continuous welding and injection molding and press forming as the bonding methods of the metallic member and the fiber-reinforced resin member in the bonding step (S16), and high shearing strength is obtained and a rate of decrease is suppressed before and after the temperature change impact test by using the bonding method that prevents the overall metallic member from reaching a high temperature.

According to the results of comparative examples 5 and 6, it was confirmed that surface treatment (blasting step (S12)) for roughening the surface of the metallic member is necessary in the manufacture of the composite member. It was confirmed that the metallic member and the fiber-reinforced resin member are not bonded to each other in the absence of the surface treatment (blasting step (S12)) regardless of the presence or absence of the additive.

By comparing examples 1 and 6 with comparative examples 1 to 6, it was confirmed that the composite member on which the manufacturing method according to the embodiment is performed has large shearing strength and a low rate of decrease before and after the temperature change impact test regardless of the kind of material of the metallic member. By comparing examples 1 and 7 with comparative examples 1 to 6, it was confirmed that the composite member on which the manufacturing method according to the embodiment is performed has large shearing strength and a low rate of decrease before and after the temperature change impact test regardless of the kind of material of the fiber part in the fiber-reinforced resin member. By comparing examples 5, 8, 9 and 10 with comparative examples 1 to 6, it was confirmed that the composite member on which the manufacturing method according to the embodiment is performed has large shearing strength and a low rate of decrease before and after the temperature change impact test regardless of the kind of material of the matrix resin (resin part) in the fiber-reinforced resin member.

What is claimed is:

1. A method of manufacturing a composite member including a metallic member and a fiber-reinforced resin member bonded to each other, the method comprising:

performing surface treatment in such a way as to form micro-order or nano-order asperities on a surface of the metallic member;

adding a compound having a fluorene skeleton to the fiber-reinforced resin member; and directly bonding the metallic member and the fiber-reinforced resin member by repeatedly bonding a melted portion of the fiber-reinforced resin member to the surface of the metallic member by using a forming apparatus having a pressing part while partially melting the fiber-reinforced resin member containing the compound added by the adding and while relatively moving the pressing part of the forming apparatus along the surface of the metallic member, wherein the surface of the metallic member is at a temperature of 80° C. or less, the metallic member having the asperities formed by the surface treatment.

2. The method according to claim 1, wherein an arithmetic mean inclination on the surface of the metallic member having the asperities formed by the surface treatment is 0.17 or more and 0.50 or less.

3. The method according to claim 2, wherein the surface treatment includes forming the asperities by blasting.

4. The method according to claim 1, wherein an arithmetic mean inclination on the surface of the metallic member having the asperities formed by the surface treatment is 0.17 or more and 0.50 or less.

5. The method according to claim 4, wherein the surface treatment includes forming the asperities by blasting.

6. The method according to claim 1, wherein the surface treatment includes forming the asperities by blasting.

7. The method according to claim 1, wherein the surface treatment includes forming the asperities by blasting.

8. The method according to claim 1, wherein the bonding includes directly bonding the fiber-reinforced resin member to the surface of the metallic member by tape placement molding or ultrasonic continuous welding.

9. The method according to claim 8, wherein an arithmetic mean inclination on the surface of the metallic member having the asperities formed by the surface treatment is 0.17 or more and 0.50 or less.

10. The method according to claim 9, wherein the surface treatment includes forming the asperities by blasting.

11. The method according to claim 8, wherein an arithmetic mean inclination on the surface of the metallic member having the asperities formed by the surface treatment is 0.17 or more and 0.50 or less.

12. The method according to claim 11, wherein the surface treatment includes forming the asperities by blasting.

13. The method according to claim 8, wherein the surface treatment includes forming the asperities by blasting.

14. The method according to claim 8, wherein the surface treatment includes forming the asperities by blasting.

* * * * *